United States Patent
Xie et al.

(10) Patent No.: US 12,495,925 B2
(45) Date of Patent: Dec. 16, 2025

(54) POT LID ASSEMBLY FOR PRESSURE COOKER AND PRESSURE COOKER

(71) Applicant: FOSHAN SHUNDE MIDEA ELECTRICAL HEATING APPLIANCES MANUFACTURING CO., LTD., Foshan (CN)

(72) Inventors: Liting Xie, Foshan (CN); Shujun Shan, Foshan (CN); Weifei Xue, Foshan (CN); Xiaokui Ma, Foshan (CN); Nannan An, Foshan (CN); Tianlin Fu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 111 days.

(21) Appl. No.: 18/396,044

(22) Filed: Dec. 26, 2023

(65) Prior Publication Data
US 2024/0206668 A1 Jun. 27, 2024

(30) Foreign Application Priority Data
Dec. 27, 2022 (CN) .......................... 202211691154.0

(51) Int. Cl.
*A47J 27/08* (2006.01)
(52) U.S. Cl.
CPC ................................ *A47J 27/0813* (2013.01)
(58) Field of Classification Search
CPC .. A47J 27/0813; A47J 27/092; A47J 27/0804; A47J 27/08; A47J 36/10; B65D 45/32; B65D 2543/00972; B65D 2543/00537; B65D 2543/00092; B65D 2543/00555; B65D 45/345

USPC ............. 220/320, 321, 378, 654, 319, 316; 292/256.67, 256.6
See application file for complete search history.

(56) References Cited

U.S. PATENT DOCUMENTS

| | | | | | |
|---|---|---|---|---|---|
| 3,983,260 | A | * | 9/1976 | Ford | A47J 27/08 422/26 |
| 6,401,958 | B1 | * | 6/2002 | Foss | F16J 13/06 220/320 |
| 6,435,576 | B1 | * | 8/2002 | Kusta | B65D 45/32 292/256.65 |

(Continued)

FOREIGN PATENT DOCUMENTS

| GB | 634659 A | 3/1950 |
|---|---|---|
| WO | 2009082104 A1 | 7/2009 |

OTHER PUBLICATIONS

The European Patent Office (EPO) Extended Search Report for EP Application No. 23220363.8, Jul. 8, 2024 9 Pages.

*Primary Examiner* — King M Chu
(74) *Attorney, Agent, or Firm* — Anova Law Group, PLLC

(57) ABSTRACT

A pot lid assembly includes a lid body, a plurality of lock members arranged in a circumferential direction of the lid body and each being movable between a lock position at which the lock member is close to a middle of the lid body and an unlock position at which the lock member is far away from the middle of the lid body, a connector extending in the circumferential direction of the lid body and connected to the plurality of lock members, and a drive device connected to the connector. The drive device is configured to drive the connector deform to drive the plurality of lock member.

20 Claims, 22 Drawing Sheets

(56) References Cited

U.S. PATENT DOCUMENTS

2013/0068113 A1\* 3/2013 Chameroy .......... A47J 27/0804
49/465
2014/0053738 A1\* 2/2014 Randall .................. A47J 36/10
99/324

\* cited by examiner

POT LID ASSEMBLY FOR PRESSURE COOKER AND PRESSURE COOKER

CROSS-REFERENCE TO RELATED APPLICATION

This application claims priority to Chinese Application No. 202211691154.0, filed on Dec. 27, 2022, the entire content of which is incorporated herein by reference.

FIELD

The present disclosure relates to the field of household appliances, and more particularly, to a pot lid assembly for a pressure cooker and a pressure cooker.

BACKGROUND

For a clamp-type pressure pot in the related art, a pot lid and an edge of a pot body are closed to each other by at least two clamps. Specifically, a drive structure is provided at a central position of the pot lid. A connection rod is hinged to the pot lid and has the same number as the clamp. A front end of the connection rod is hinged to the clamp. The clamp may be driven by the drive structure by the connection rod to move. Therefore, opening and closing of the pot lid is controllable.

However, during actual production and manufacturing, the connection rod and the clamp are difficult to be integrally formed. The connection rod and the clamp are usually connected to each other through welding or screws connection. In addition, a guide post needs to be welded at the pot lid. In this way, the pot lid of a pressure cooker have a multitude of parts and a complex structure, the pot lid of the pressure cooker also requires numerous welding steps and has a high requirement for welding processes. Therefore, material and labor costs are caused to be high.

SUMMARY

The present disclosure aims to at least solve one of the technical problems existing in the related art. To this end, an objective of the present disclosure is to provide a pot lid assembly for a pressure cooker. The pot lid assembly for the pressure cooker is simple in structure and convenient in assembly and disassembly. Therefore, production difficulty and production costs are reduced. Moreover, production efficiency is improved.

The present disclosure also provides a pressure cooker having the pot lid assembly for the pressure cooker as described above.

According to embodiments of a first aspect of the present disclosure, the pot lid assembly for the pressure cooker includes a lid body, a plurality of lock members, a connector, and a drive device. The plurality of lock members is arranged in a circumferential direction of the lid body. Each of the plurality of lock members is movable between a lock position in which the lock member is close to a middle of the lid body and an unlock position in which the lock member is far away from the middle of the lid body. The connector extends in the circumferential direction of the lid body and is connected to the plurality of lock members. The drive device is connected to the connector. The drive device is configured to drive the connector to be deformed to drive the plurality of lock members by the connector to move between the lock position and the unlock position.

With the pot lid assembly for the pressure cooker according to the embodiments of the present disclosure, by providing the connector extending in the circumferential direction of the lid body, the connector can be pulled by the drive device to be tensioned. The plurality of lock members can be driven by the connector to move towards the lock position from the unlock position. In this way, the pot lid assembly can be locked at the lid body by the lock members. The connector may also be loosened by the drive device. The lock member can be driven by the connector to move towards the unlock position from the lock position to allow the lock member to be unlock from the pot body assembly, thereby realizing a lid opening. Compared with a clamp-type pressure pot in the related art, the structure is simpler, and assembly and disassembly are more convenient. As a result, the production difficulty and production cost are reduced. Moreover, the production efficiency is improved.

According to some embodiments of the present disclosure, the connector is a metal member.

According to some embodiments of the present disclosure, the connector is of a strip-shaped structure having a width ranging from 2 mm to 20 mm and a thickness ranging from 0.1 mm to 3 mm.

According to some embodiments of the present disclosure, the drive device includes a first rotation member and a drive member. The first rotation member is connected to the connector to pull the connector to be deformed. The drive member is connected to the first rotation member to drive the first rotation member to rotate.

In some embodiments, the connector has an end connected to the first rotation member to be wound around the first rotation member during the rotation of the first rotation member.

In some embodiments, the first rotation member is provided with a plurality of first meshing teeth arranged in a circumferential direction of the first rotation member, and the connector is provided with a plurality of first mating teeth arranged in an extending direction of the connector. The first rotation member is in a transmission connection with the connector by the plurality of first meshing teeth and the plurality of first mating teeth.

In some embodiments, the pot lid assembly further includes a retain device in a transmission connection with the connector to block the lock member from moving towards the unlock position from the lock position by the connector.

In some exemplary embodiments, the retain device includes a second rotation member and a retain member. The second rotation member is in a transmission connection with the connector to move synchronously with the connector. The retain member is in a one-way transmission connection with the second rotation member. The retain member is configured to only permit unidirectional rotation of the second rotation member to block the lock member from moving towards the unlock position from the lock position by the connector.

In some examples, the second rotation member has a plurality of second meshing teeth. Each of the plurality of second meshing teeth has a stop surface and a guide surface opposite to the stop surface. The retain member is configured to, in a state where the second rotation member rotates in a first direction, slide relative to the guide surface and be engaged with the stop surface to block the second rotation member from rotating in a second direction opposite to the first direction.

In some examples, the second rotation member is fixedly connected to the first rotation member to allow for a coaxial rotation of the second rotation member with the first rotation member.

In some examples, one of the second rotation member and the retain member is movable between a first position at which the second rotation member is engaged with the retain member and a second position at which the second rotation member is disengaged from the retain member.

In some specific examples, the one of the second rotation member and the retain member or the lid body is provided with a limit member configured to limit a travel of the one of the second rotation member and the retain member.

In some examples, the lid body is provided with a reset member connected to the one of the second rotation member and the retain member to drive the one of the second rotation member and the retain member to move towards the first position.

In some examples, the one of the second rotation member and the retain member is movable between the first position and the second position in a predetermined direction.

In some exemplary examples, the lid body has a slide member. One of the second rotation member and the retain member has a slide mating member engaged with the slide member.

In some exemplary examples, the predetermined direction is parallel to a rotation axis of the one of the second rotation member and the retain member, or the predetermined direction is tilted relative to the rotation axis of the one of the second rotation member and the retain member.

In some embodiments, the one of the second rotation member and the retain member is swingable between the first position and the second position.

In some exemplary embodiments, the lid body is provided with a mounting base, and one of the second rotation member and the retain member is disposed at the mounting base in a swingable manner.

According to a further embodiment of the present disclosure, in an extending direction of the connector, the connector has a first end connected to the lid body and a second end connected to the drive device.

In some embodiments, the lid body is provided with at least one guide member for guiding a sliding direction of the connector.

In some embodiments, the lid body is provided with a guide member including a guide rod. The first end of the connector is slidably engaged with the guide rod.

In some specific embodiments, the first end of the connector has a connection hole. The guide rod passes through the connection hole. Each of two ends of the guide rod is provided with an anti-disengagement lug having a size greater than a size of the connection hole.

In some exemplary embodiments, the guide rod extends in a radial direction of the lid body or obliquely extends relative to the radial direction of the lid body.

In some exemplary embodiments, the guide member further includes a fixation base. An end of the guide rod is movably connected to the fixation base.

In some exemplary embodiments, the lid body is provided with a movable toggle member connected to two ends of the connector. The toggle member is configured to toggle, in a state where the connector is driven by the drive device to be deformed, the first end of the connector to slide along the guide rod.

In some examples, the toggle member is formed as a toggle rod. The toggle has two ends fixedly or movably connected to the first end and the second end of the connector, respectively.

In some exemplary examples, the toggle rod is rotatably connected to the lid body in a middle of the toggle rod. The second end of the connector is provided with a first stop member and a second stop member that are arranged in an extending direction of the connector. The toggle rod has a second end located between the first stop member and the second stop member. The toggle rod is configured to rotate when being driven by the first stop member and the second stop member, toggle the first end of the connector to slide along the guide rod.

According to a further embodiment of the present disclosure, the drive member is a manually operated drive member or an electrically operated drive member.

According to embodiments of a second aspect of the present disclosure, a pressure cooker includes a pot body assembly and the pot lid assembly for the pressure cooker as described according to the above embodiments. The plurality of lock members is configured to lock the pot body assembly when being at the lock position and to unlock the pot body assembly when being at the unlock position.

According to the pressure cooker in the embodiments of the present disclosure, by employing the pot lid assembly as described above, simplification of a structure of the pressure cooker is beneficial, which allows for more convenient assembling and disassembling steps. Therefore, the production difficulty and the production cost are reduced. In addition, the production efficiency is improved.

Additional aspects and advantages of the present disclosure will be set forth in part from the following description, and in part will become apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments in conjunction with the accompanying drawings, in which.

Figure 1:
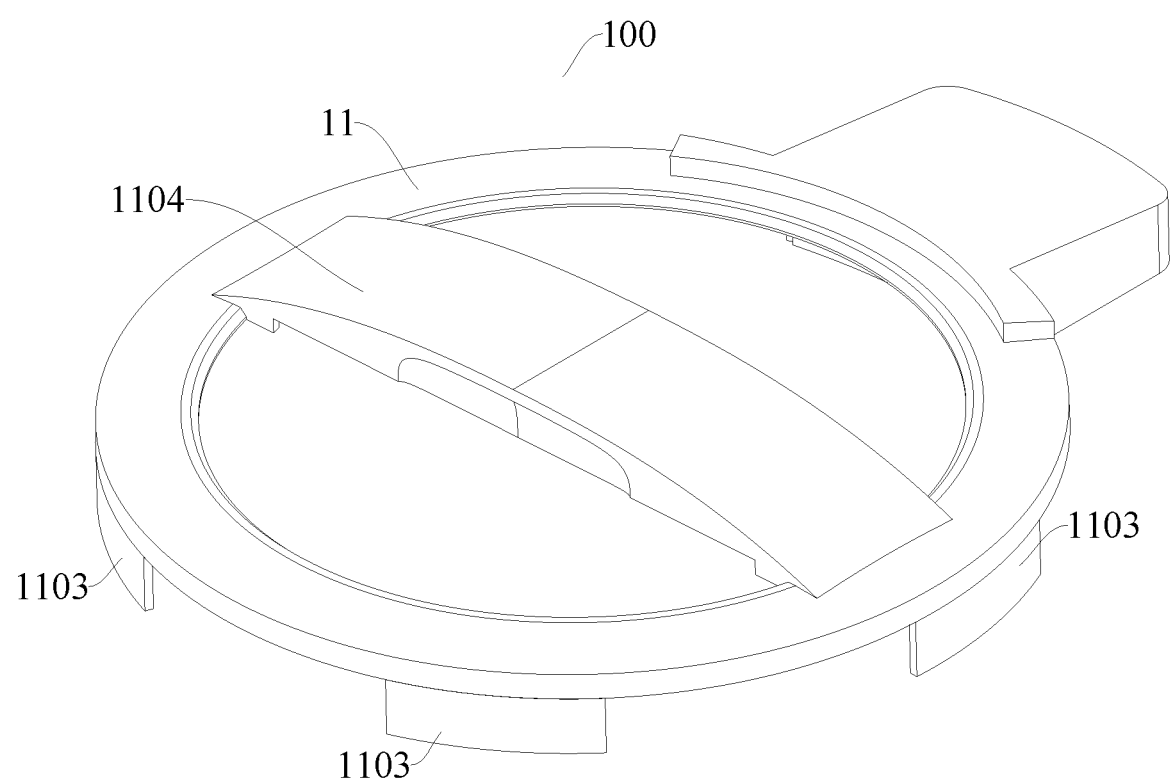
FIG. 1 is a schematic structural view of a pot lid assembly for a pressure cooker according to an embodiment of the present disclosure.

REFERENCE NUMERALS pressure cooker 1, pot lid assembly 100,
lid body 11, inner lid 1101, surface lid 1102, shield member 1103, handle 1104,
guide member 111, guide member 112, guide rod 1121, fixation base 1122, anti-disengagement lug 1123,
lock member 12, side baffle 121, top plate 122, bottom plate 123, lock groove 124,
connector 13, first end 1301, second end 1302, first mating tooth 131, first stop member 1311, second stop member 1312, toggle member 133,
drive device 14, first rotation member 141, first meshing tooth 1410, drive member 142,
retain device 15, second rotation member 151, second meshing teeth 1510, stop surface 1511, guide surface 1512, retain member 152, elastic member 153, operation member 154, mounting protrusion 155, connection protrusion 156,
reset member 16, mounting base 17, limit member 18, slide member 19,
pot body assembly 200.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the accompanying drawings are illustrative only, and are intended to explain, rather than limiting the present disclosure.

A pot lid assembly 100 for a pressure cooker according to embodiments of the present disclosure will be described below with reference to FIG. 1 to FIG. 21.

As illustrated in FIG. 1 to FIG. 12, according to the embodiments of the present disclosure, the pot lid assembly 100 for the pressure cooker includes a lid body 11 and a plurality of lock members 12.

The plurality of lock members 12 is arranged in a circumferential direction of the lid body 11. Each of the plurality of lock members 12 is movable between a lock position and an unlock position. When the lock members 12 are at the lock position, the lock members 12 are close to a middle of the lid body 11. In this way, the lock members 12 may be locked to a pot body assembly 200 to lock the pot lid assembly 100 at the pot body assembly 200. When the lock members 12 are at the unlock position, the lock members 12 are far away from the middle of the lid body 11. In this way, the lock members 12 is separated from the pot body assembly 200. Therefore, the pot lid assembly 100 can be removed from the pot body assembly 200. In addition, the pot lid assembly 100 may include two or more lock members 12.

Further, the pot lid assembly 100 for the pressure cooker also includes a connector 13 and a drive device 14. The connector 13 extends in the circumferential direction of the lid body 11. Moreover, the connector 13 is connected to the plurality of lock members 12. The drive device 14 is connected to the connector 13. The drive device 14 may drive the connector 13 to be deformed in such a manner that the plurality of lock members 12 is driven by the connector 13 to move between the lock position and the unlock position.

It should be noted that the deformation of the connector 13 herein may be a change in a bending degree of the connector 13 or a change in a length of the connector 13 in the circumferential direction of the lid body 11.

With the pot lid assembly 100 for the pressure cooker according to the embodiments of the present disclosure, by providing the connector 13 extending in the circumferential direction of the lid body 11, the connector 13 may be pulled to be tensioned by utilizing the drive device 14. The plurality of lock members 12 may be driven by the connector 13 to move towards the lock position from the unlock position. In this way, the pot lid assembly 100 can be locked at a lid body by using the lock members 12. The connector 13 may also be loosened by the drive device 14. The lock members 12 may be driven by the connector 13 to move towards the unlock position from the lock position. Therefore, the lock members 12 are separated from the pot body assembly to realize lid opening. Compared with a clamp-type pressure pot in the related art, the structure is simpler, and assembly and disassembly are more convenient. As a result, production difficulty and production cost are reduced. Moreover, production efficiency is improved.

Figure 2:
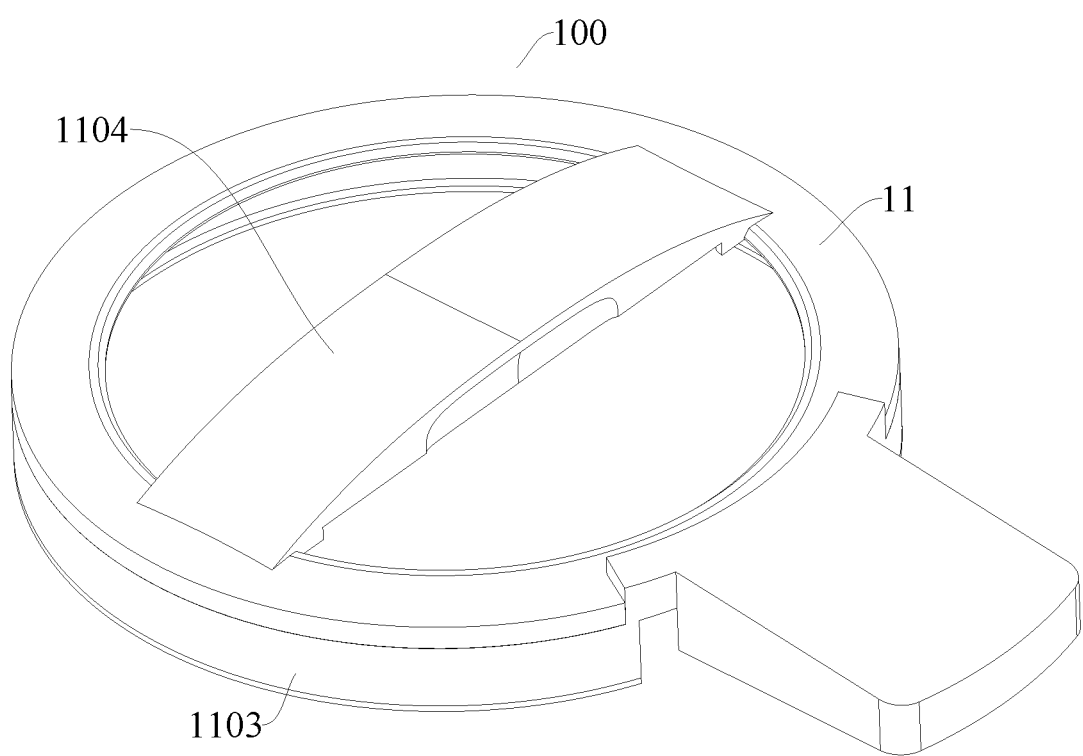
FIG. 2 is a schematic structural view of a pot lid assembly for a pressure cooker according to another embodiment of the present disclosure.

As illustrated in FIG. 1 and FIG. 2, according to some embodiments of the present disclosure, the lid body 11 includes an inner lid 1101 and a surface lid 1102. The surface lid 1102 is disposed above the inner lid 1101. The surface lid 1102 has a shield member 1103 at a side of the surface lid 1102.

In some embodiments, the shield member 1103 is formed into an annular structure. The plurality of lock members 12 is disposed at the inner lid 1101 and located inside the shield member 1103. When the pot lid assembly 100 and the pot body assembly 200 are locked together, the shield member 1103 can shield the connector 13 and the lock members 12. In this way, full wrapping of the connector 13 and the lock members 12 is realized. Therefore, an appearance of the pressure cooker 1 is ensured to be attractive.

As illustrated in FIG. 1, in other embodiments, a plurality of shield members 1103 is provided. The plurality of shield members 1103 are arranged at intervals in a circumferential direction of a top wall of the surface lid 1102. At least one lock member 12 is disposed between two adjacent shield members 1103. When the pot lid assembly 100 and the pot body assembly 200 are locked together, the shield member 1103 shields the connector 13, and the lock members 12 are exposed. In this way, it can be clearly seen that whether the pot lid assembly 100 and the pot body assembly 200 are locked in place.

According to some embodiments of the present disclosure, the surface lid 1102 is provided with a handle 1104, which is convenient for a user to hold. Therefore, opening and closing of the pot lid assembly 100 can be realized.

According to some embodiments of the present disclosure, the connector 13 is fixedly connected to the lock members 12. For example, the connection between the connector 13 and the lock members 12 may be realized by using a fastener. For another example, the connection between the connector 13 and the lock members 12 may be realized by using a snap structure. For yet another example, the connection between the connector 13 and the lock members 12 may be realized through welding.

Figure 4:
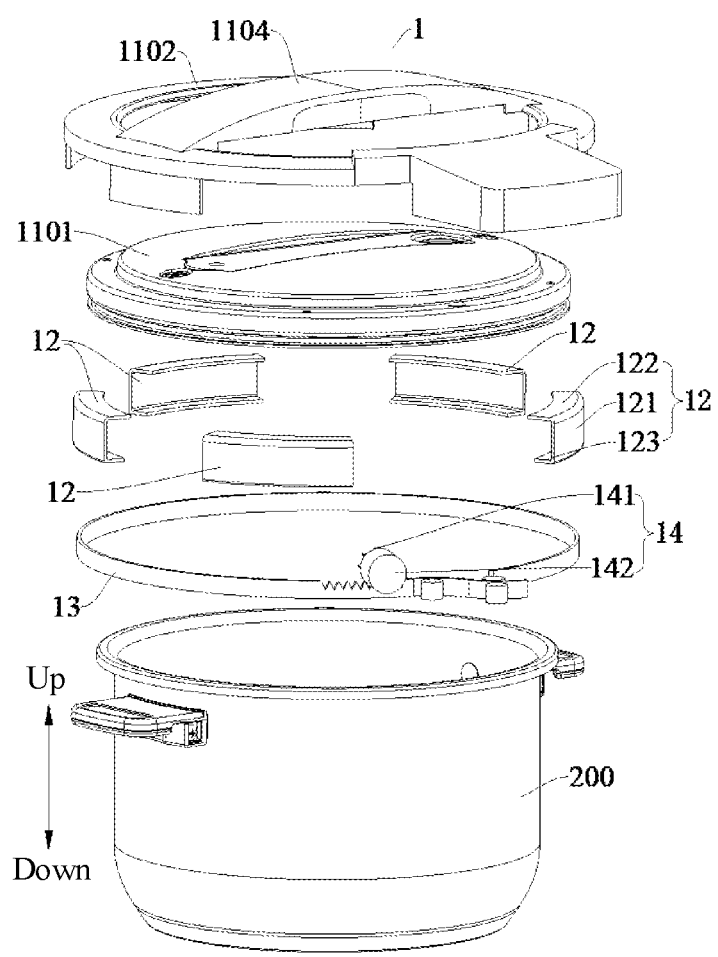
FIG. 4 is a exploded structural view of the pressure cooker shown in FIG. 3.

As illustrated in FIG. 4, in some embodiments, each lock member 12 includes a side baffle 121, a top plate 122, and a bottom plate 123. The top plate 122 is connected to an upper end of the side baffle 121. The bottom plate 123 is connected to a lower end of the side baffle 121. A lock groove 124 is defined between the side baffle 121, the top plate 122, and the bottom plate 123.

Further, the connector 13 is disposed in the lock groove 124. Moreover, the connector 13 may be fixedly connected to the side baffle 121 or other structures of the lock member 12. When the lock members 12 are at the lock position, the lock groove 124 is engaged with pot teeth at the pot body assembly 200. In this way, the pot lid assembly 100 can be locked at the pot body assembly 200.

The lock member 12 may be formed a structure having constant or variable section.

According to other embodiments of the present disclosure, the plurality of lock members 12 is movably disposed at the lid body 11 between the lock position and the unlock position, respectively. The connector 13 is movably connected to the lock members 12. When the connector 13 is driven by the drive device 14 to be deformed, the lock members 12 may be driven by the connector 13 to move between the lock position and the unlock position.

In some embodiments, the connector 13 may be a metal member. For example, the connector 13 is made of 304 stainless steel.

The connector 13 is made of a metal material. In this way, a structural strength of the connector 13 can be enhanced. Moreover, the connector 13 is prevented from fracturing, thereby prolonging a service life of the connector 13, which in turn prolongs a service life of the pressure cooker 1. Moreover, the connector 13 can restore to its original state by utilizing an elastic deformation reversible property of the metal material. In this way, use reliability of the connector 13 can be ensured. As a result, normal lock and unlock of the lock members 12 can be further ensured.

In other embodiments of the present disclosure, the connector 13 may also be a non-metal member. For example, the connector 13 is made of an organic material or an inorganic material. The connector 13 may also be an elastic material such as a rubber band.

According to some embodiments of the present disclosure, the connector 13 is of a strip-shaped structure. For example, the connector 13 is a steel belt or a resin belt. The drive device 14 may directly control tensioning or loosening of the connector 13.

The strip-shaped structure has a width ranging from 2 mm to 20 mm, a thickness ranging from 0.1 mm to 3 mm, and a length greater than or equal to half of a circumference of the lid body 11.

For example, the width of the strip-shaped structure may be 2 mm, 5 mm, 10 mm, 15 m, 20 mm, or the like. The thickness of the strip-shaped structure is 0.1 mm, 0.5 mm, 1 mm, 1.5 mm, 2 mm, 2.5 mm, 3 mm, or the like.

In some embodiments, the length of the strip-shaped structure may be equal to half of the circumference of the lid body 11, the circumference of the lid body 11, twice the circumference of the lid body 11, or the like. The circumference of the lid body 11 here refers to the circumference of an outer peripheral wall of the lid body 11.

Therefore, by constructing the connector 13 into the strip-shaped structure, the structural strength of the connector 13 can be ensured, and the connection between the connector 13 and the lock members 12 is also facilitated.

As illustrated in FIG. 4 and FIG. 5, and FIG. 7 and FIG. 8, according to some embodiments of the present disclosure, the drive device 14 includes a first rotation member 141. The first rotation member 141 is connected to the connector 13. During a rotation of the first rotation member 141, the first rotation member 141 may pull the connector 13 to be deformed. In this way, the lock members 12 are driven by the connector 13 to move towards the lock position from the unlock position. When an external force exerted by the first rotation member 141 is removed, the connector 13 may restore to its original state, to drive the lock members 12 to move towards the unlock position from the lock position.

Further, the drive device 14 further includes a drive member 142. The drive member 142 is connected to the first rotation member 141. The first rotation member 141 may be driven by the drive member 142 to rotate. By providing the drive member 142, the first rotation member 141 can be driven by the drive member 142 to rotate. In this way, the first rotation member 141 can pull the connector 13 to be deformed, and then the lock members 12 can be driven by the connector 13 to move towards the lock position from the unlock position.

In some embodiments, the drive member 142 is a manually operated drive member 142. For example, the drive member 142 is formed as a knob. In this way, the first rotation member 141 may be driven by the knob to rotate. The drive member 142 is exposed at an outer surface of the lid body 11. Therefore, a user operation is facilitated.

Figure 3:
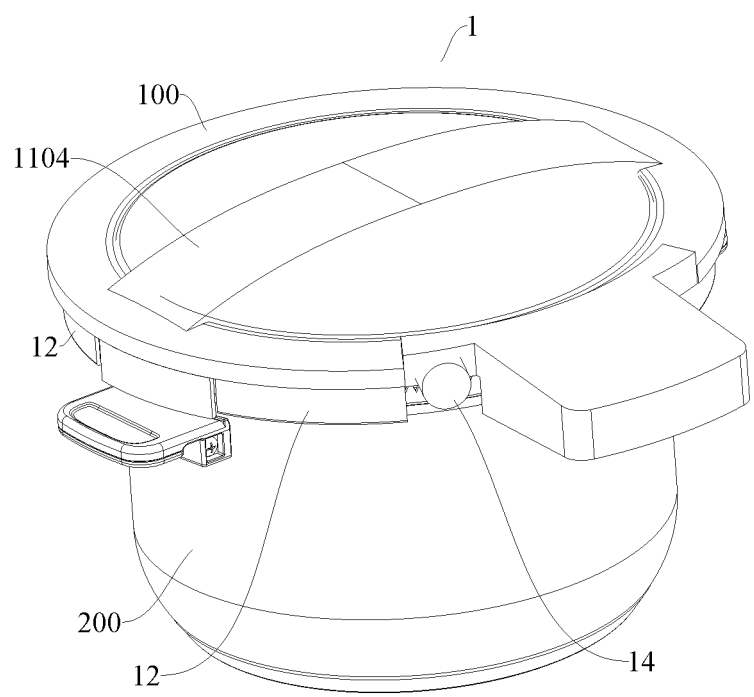
FIG. 3 is a schematic structural view of a pressure cooker according to an embodiment of the present disclosure.
Figure 5:
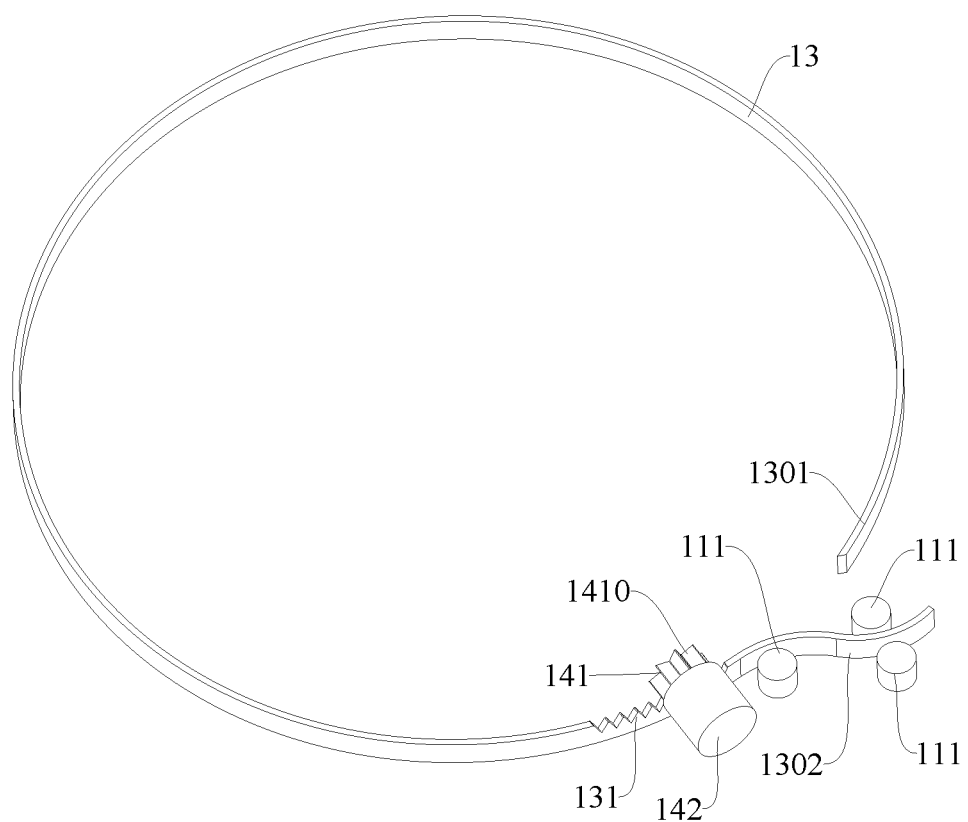
FIG. 5 is a schematic structural view of a connector and a drive device of the pressure cooker shown in FIG. 4.

As illustrated in FIG. 3 and FIG. 5, in the embodiment, a rotation axis of the first rotation member 141 is parallel to a horizontal plane. The drive member 142 is fixedly connected to the first rotation member 141, and an outer surface of a side wall of the lid body 11 is exposed. An operator may rotate the drive member 142 to drive the first rotation member 141 to rotate through the drive member 142.

Figure 6:
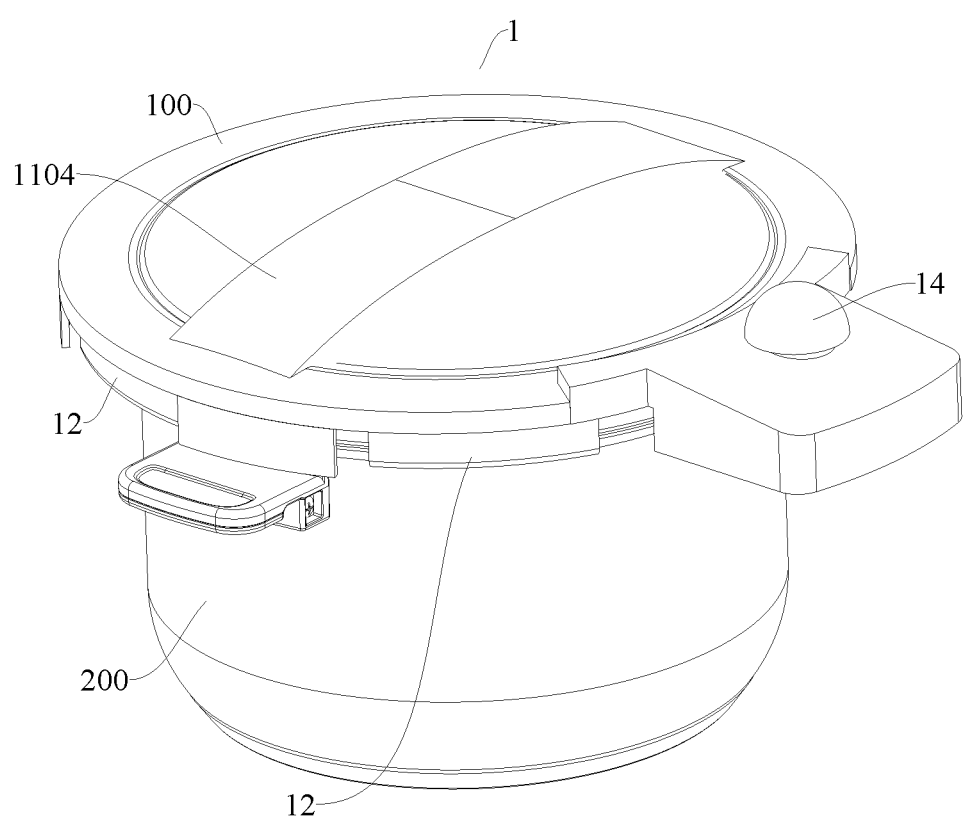
FIG. 6 is a schematic structural view of a pressure cooker according to another embodiment of the present disclosure.
Figure 8:
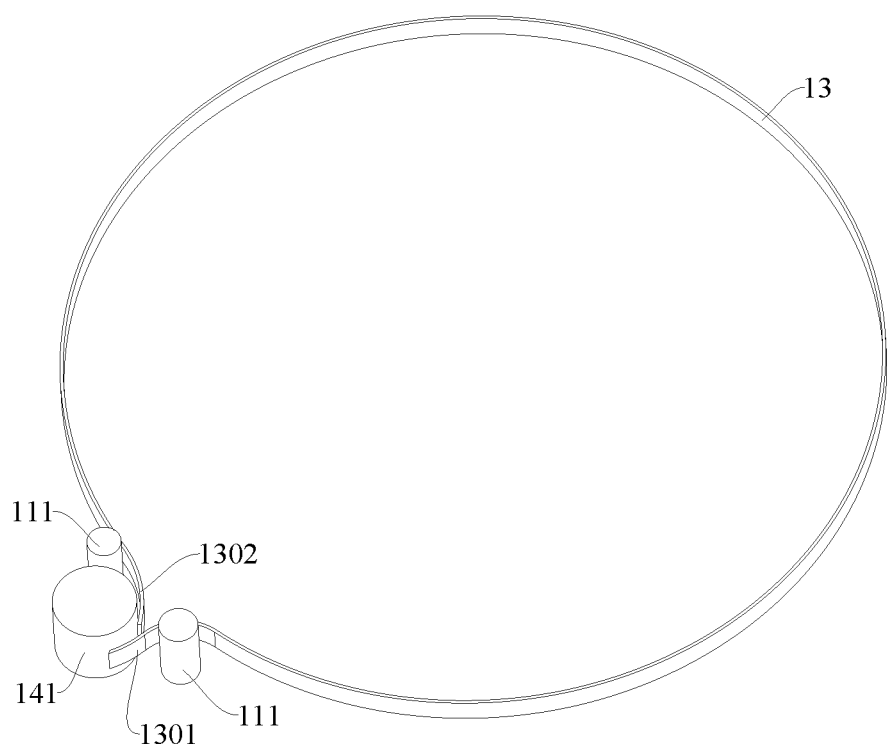
FIG. 8 is a schematic structural view of a connector and a drive device of the pressure cooker shown in FIG. 7.
Figure 9:
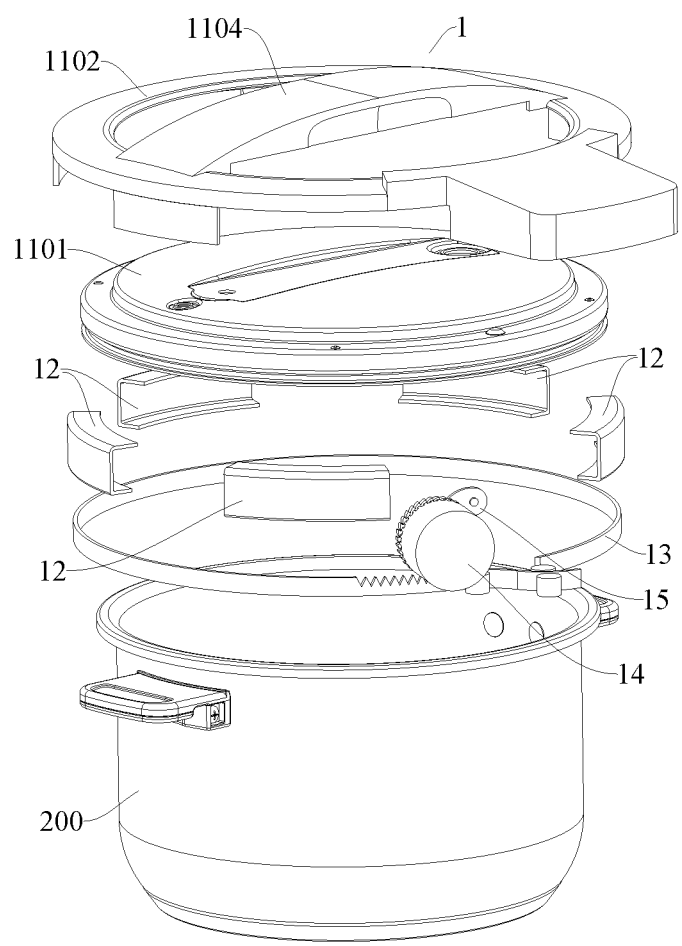
FIG. 9 is a exploded structural view of a pressure cooker according to another embodiment of the present disclosure.

As illustrated in FIG. 6 and FIG. 8, in the embodiment, the rotation axis of the first rotation member 141 is perpendicular to the horizontal plane. The drive member 142 is fixedly connected to the first rotation member 141, and an upper surface of the lid body 11 is exposed. The operator may rotate the drive member 142 to drive the first rotation member 141 to rotate through the drive member 142.

In some other embodiments, the drive member 142 is an electrically operated drive member 142. In an exemplary embodiment of the present disclosure, a control button is located outside the lid body 11. A control is in communication with the drive member 142 and may control the drive member 142 to operate. The first rotation member 141 is driven by the drive member 142 to rotate. In this way, the first rotation member 141 can pull the connector 13 to be deformed, and then the lock members 12 are driven by the connector 13 to move towards the lock position from the unlock position. The control may be a control button.

As illustrated in FIG. 3 to FIG. 5, in some embodiments, the first rotation member 141 is provided with a plurality of first meshing teeth 1410. The plurality of first meshing teeth 1410 is arranged in a circumferential direction of the first rotation member 141. The connector 13 is provided with a plurality of first mating teeth 131. The plurality of first mating teeth 131 is arranged in an extending direction of the connector 13. The first rotation member 141 is in a transmission connection with the connector 13 by the plurality of first meshing teeth 1410 and the plurality of first mating teeth 131.

Therefore, by the mutual meshing between the plurality of first meshing teeth 1410 and the plurality of first mating teeth 131, the connector 13 can be controlled to be tensioned or loosened, thereby realizing control on travel of the lock members 12. Therefore, transmission precision is high, and the transmission is reliable and stable. In addition, it is beneficial to an increase in the service life.

In an exemplary embodiment of the present disclosure, the first rotation member 141 may be a gear. The connector 13 is provided with a rack arranged in an extending direction thereof. The rack and the gear are meshed with each other.

When the drive member 142 drives the first rotation member 141 to rotate forwardly, the first rotation member 141 and the connector 13 are meshed with each other. In this way, the connector 13 may be pulled to be tensioned, resulting in deformation of the connector. Finally, the lock members 12 are driven by the connector 13 to move towards the lock position from the unlock position. Therefore, the lock members 12 and the pot body assembly 200 are locked together. Moreover, the pot lid assembly 100 is locked at the pot body assembly 200.

When the first rotation member 141 is driven by the drive member 142 to rotate reversely, the first rotation member 141 and the connector 13 are meshed with each other. In this way, the connector 13 may be pulled to be loosened. That is, the connector 13 restores to its original state. Finally, the lock members 12 are driven by the connector 13 to move towards the unlock position from the lock position, to separate the lock members 12 from the pot body assembly 200. Therefore, the pot lid assembly 100 can be removed from the pot body assembly 200.

Figure 7:
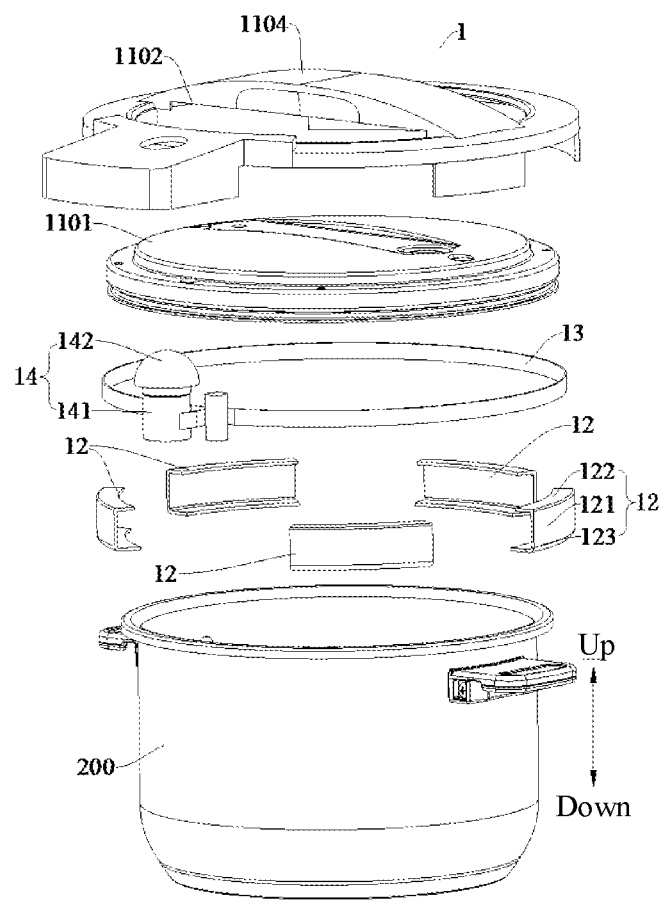
FIG. 7 is a exploded structural view of the pressure cooker shown in FIG. 6.

As illustrated in FIG. 6 to FIG. 8, in some embodiments, an end of the connector 13 is connected to the first rotation member 141. When the first rotation member 141 is driven by the drive member 142 to rotate, the connector 13 may be gradually wound around the first rotation member 141. In this way, the connector 13 can be pulled by the first rotation member 141 to move, allowing the connector 13 to be deformed. Finally, the lock members 12 are driven by the connector 13 to move towards the lock position from the unlock position, to lock the lock members 12 and the pot body assembly 200 together. Therefore, the pot lid assembly 100 can be locked at the pot body assembly 200.

As illustrated in FIG. 9 to FIG. 12, in some embodiments, the pot lid assembly 100 for the pressure cooker further includes a retain device 15. The retain device 15 is in a transmission connection with the connector 13. In this way, in a process where the connector 13 is driven by the first rotation member 141 to be tensioned, the retain device 15 can block the resilience of the connector 13. Therefore, the connector 13 can block the lock members 12 from moving towards the unlock position from the lock position. Moreover, in this process, the operator can release his/her hand at any time, and in this case, the resilience of the connector 13 would not occur. As a result, the lock members 12 can be retained at any position between the unlock position and the lock position.

In some exemplary embodiments, the retain device 15 includes a second rotation member 151 and a retain member 152. The second rotation member 151 is in a transmission connection with the connector 13, to allow the second rotation member 151 to move synchronously with the connector 13. The retain member 152 is in a one-way transmission connection with the second rotation member 151. The retain member 152 is configured to only permit unidirectional rotation of the second rotation member 151. In this way, the connector 13 can block the lock members 12 from moving towards the unlock position from the lock position.

That is, in a state where the second rotation member 151 and the retain member 152 cooperate with each other, the retain member 152 may provide a retaining function. In this way, the second rotation member 151 can only rotate in one direction, and cannot rotate reversely. Therefore, it is possible to avoid the resilience of the connector 13.

In an exemplary embodiment of the present disclosure, when the second rotation member 151 rotates in the first direction, the retain member 152 would not block the second rotation member 151 from rotating in the first direction. In this way, the second rotation member 151 can move synchronously with the connector 13, to move the lock members 12 towards the lock position from the unlock position. When the second rotation member 151 rotates in a second direction opposite to the first direction, the retain member 152 can block the second rotation member 151 from rotating in the second direction, to stop the connector 13 moving and prevent the connector 13 from restoring to its original state. As a result, the lock members 12 can be blocked from moving towards the unlock position from the lock position.

Figure 10:
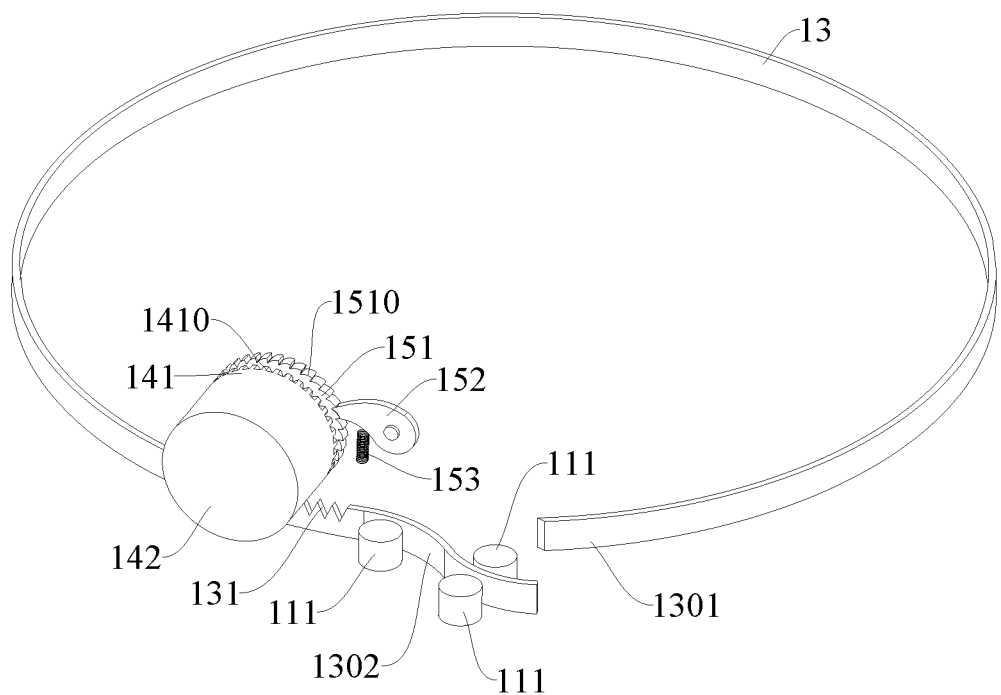
FIG. 10 is a schematic structural view of a connector and a drive device of the pressure cooker shown in FIG. 9.
Figure 11:
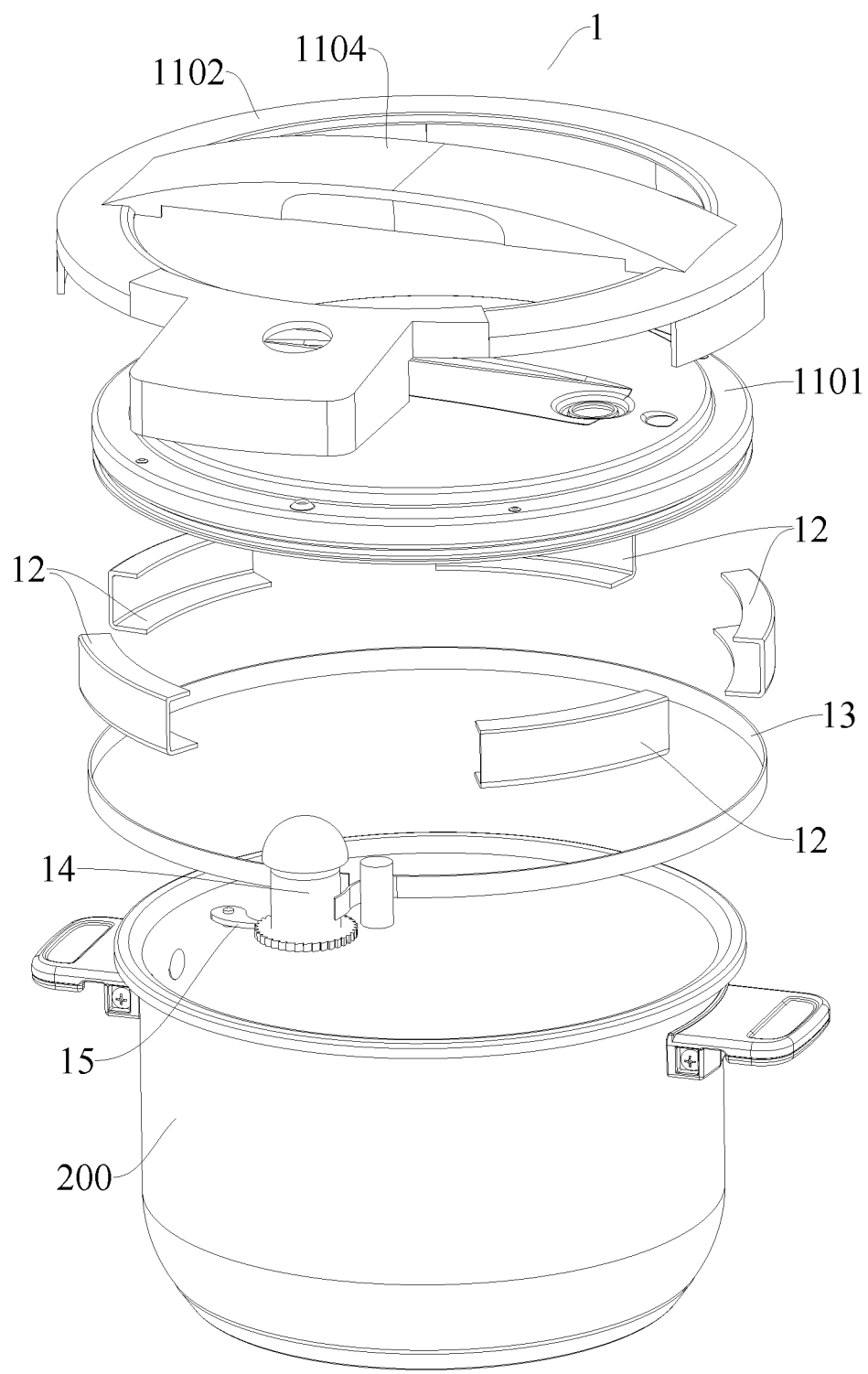
FIG. 11 is a exploded structural view of a pressure cooker according to yet another embodiment of the present disclosure.
Figure 12:
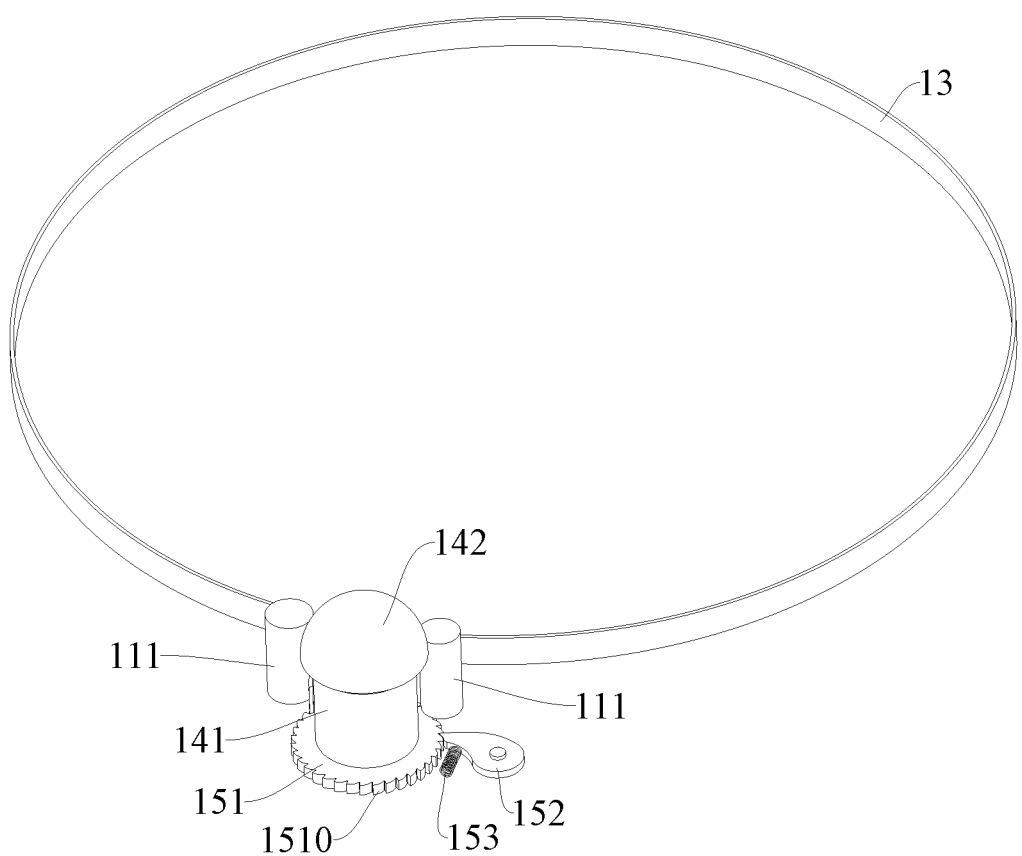
FIG. 12 is a schematic structural view of a connector and a drive device of the pressure cooker shown in FIG. 11.

As illustrated in FIG. 10 and FIG. 12, in some examples, the second rotation member 151 has a plurality of second meshing teeth 1510. The plurality of second meshing teeth 1510 is arranged in a circumferential direction of the second rotation member 151. Each of the plurality of second meshing teeth 1510 has a stop surface 1511 and a guide surface 1512. The stop surface 1511 and the guide surface 1512 are opposite to each other.

The retain member 152 is configured to slide, in a state where the second rotation member 151 rotates in the first direction, relative to the guide surface 1512. In this way, the retain member 152 does not affect the rotation of the second rotation member 151, allowing the connector 13 to be driven by the first rotation member 141 to move. Therefore, the lock members 12 can be driven by the connector 13 to move towards the lock position from the unlock position.

When the retain member 152 is engaged with the stop surface 1511, the retain member 152 can block the second rotation member 151 from rotating in the second direction opposite to the first direction, to stop the connector 13 moving and avoid the resilience of the connector 13. As a result, the lock members 12 can be blocked from moving towards the unlock position from the lock position.

In some examples, the second rotation member 151 is fixedly connected to the first rotation member 141 to allow for a coaxial rotation of the second rotation member 151 with the first rotation member 141. In this way, a linkage between the first rotation member 141 and the second rotation member 151 can be realized. Therefore, control is facilitated. In other embodiments of the present disclosure, the first rotation member 141 and the second rotation member 151 may also be spaced apart from each other in the extending direction of the connector 13.

In some exemplary examples, the second rotation member 151 and the first rotation member 141 are integrally formed. In this way, transmission connection between the second rotation member 151 with each of the connector 13 and the retain member 152 can be realized.

In some other exemplary examples, the second rotation member 151 and the first rotation member 141 are mounted at one mounting shaft. In this way, the second rotation member 151 and the first rotation member 141 can rotate synchronously with the mounting shaft.

As illustrated in FIG. 9 to FIG. 12, in some examples, the retain member 152 is rotatably disposed in the lid body 11. The pot lid assembly 100 further includes an elastic member 153. The elastic member 153 has an end connected to the retain member 152 and another end connected to the lid body 11. Therefore, it can be ensured that the retain member 152 is always engaged with the second rotation member 151.

The elastic member 153 may be a spring or a torsion spring. In other embodiments of the present disclosure, the elastic member 153 may also be mechanical parts includes other elastic materials for operation and a combination thereof. The elastic member 153 may be disposed at a side portion or other position of the second rotation member 151.

In some exemplary examples, the second rotation member 151 is a ratchet wheel, and the retain member 152 is a pawl. The pawl includes a rotation member and a toggle member. The toggle member has an end connected to the rotation member to rotate along with the rotation member, and another end configured to be engaged with the ratchet wheel. Under the action of the pawl, the ratchet wheel may only rotate in one direction.

As illustrated in FIG. 10, in the embodiment, a rotation axis of the second rotation member 151 and a rotation axis of the rotation member of the pawl are each parallel to the horizontal plane. The elastic member 153 is located below the toggle member of the pawl. Moreover, the elastic member 153 is connected to the toggle member of the pawl.

As illustrated in FIG. 12, in the embodiment, the rotation axis of the second rotation member 151 and the rotation axis of the rotation member of the pawl are each perpendicular to the horizontal plane. The elastic member 153 is located at a side portion of the toggle member of the pawl. Moreover, the elastic member 153 is connected to the toggle member of the pawl.

As illustrated in FIG. 13 to FIG. 17, in some examples, one of the second rotation member 151 and the retain member 152 is movable between a first position and a second position. At the first position, the second rotation member 151 is engaged with the retain member 152. At the second position, the second rotation member 151 is disengaged from the retain member 152.

That is, the second rotation member 151 may be engaged with the retain member 152 in a separable manner. In this way, a retaining effect may be achieved during the engagement between the second rotation member 151 and the retain member 152 to avoid the resilience of the connector 13. In this way, it is possible to allow the lock members 12 to position at any position between the unlock position and the lock position. Moreover, the retaining can be removed during the engagement between the second rotation member 151 and the retain member 152, allowing for the resilience of the connector 13. Therefore, the lock members 12 can return to the unlock position.

In an exemplary embodiment of the present disclosure, when the second rotation member 151 is engaged with the retain member 152, the retain member 152 may be in a one-way transmission connection with the second rotation member 151. When the second rotation member 151 rotates in the first direction, the second rotation member 151 would not block the second rotation member 151 from rotating in the first direction. In this way, the second rotation member 151 can move synchronously with the connector 13, allowing the lock members 12 to move towards the lock position from the unlock position. When the second rotation member 151 rotates in the second direction opposite to the first direction, the retain member 152 can block the second rotation member 151 from rotating in the second direction, to stop the connector 13 moving, which can avoid the resilience of the connector 13. As a result, the lock members 12 is blocked from moving to the unlock position from the lock position.

When the second rotation member 151 is disengaged from the retain member 152, the connector 13 may be driven by the drive device 14 to return to its original state. In this way, the lock members 12 can be driven by the connector 13 to move towards the unlock position from the lock position. Therefore, the pot lid assembly 100 can be separated from the pot body assembly. As a result, the lid opening of can be realized.

It should be noted that, when the lock members 12 are at the unlock position, the second rotation member 151 is controlled to be engaged with the retain member 152. In this case, there is a greatest distance between the lock members 12 and the middle of the lid body 11. Since an elastic potential energy is still stored in the connector 13, the connector 13 is still not in a fully relaxed state, and the second rotation member 151 is engaged with the retain member 152. In this way, the lock members 12 can be retained at the unlock position.

In some exemplary examples, the lid body 11 or one of the second rotation member 151 and the retain member 152 is provided with a limit member 18. The limit member 18 is configured to limit a travel of one of the second rotation member 151 and the retain member 152. In this way, it can be ensured that the retain device 15 restores to its initial state to allow the retain device 15 to operate normally.

Figure 13:
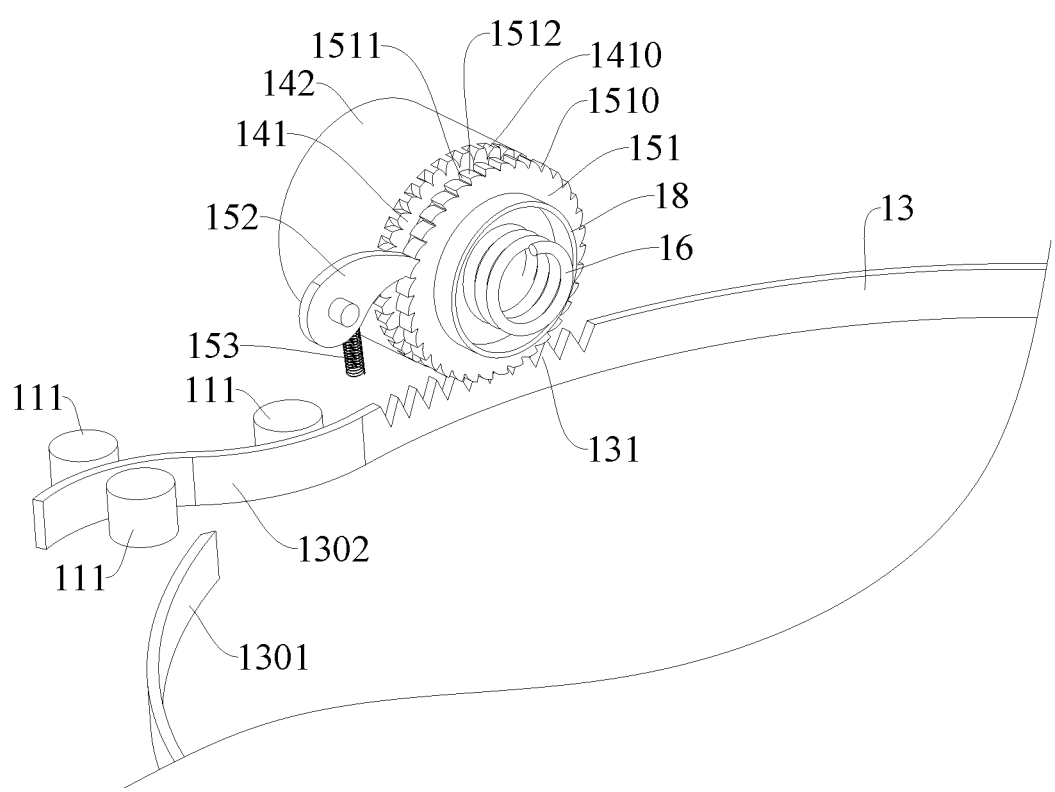
FIG. 13 is a schematic structural view of a connector and a drive device of a pressure cooker according to an embodiment of the present disclosure.

As illustrated in FIG. 13, in the embodiment, the second rotation member 151 is movable between the first position and the second position. The second rotation member 151 is provided with the limit member 18 at a side of the second rotation member 151. When the second rotation member 151 is at the first position, the limit member 18 and the lid body 11 are spaced apart from each other. In this case, the second rotation member 151 is engaged with the retain member 152 to avoid the resilience of the connector 13. When the second rotation member 151 moves to the second position, the limit member 18 abuts with the lid body 11 in such a manner that the second rotation member 151 would not continue to move. In this case, the second rotation member 151 is disengaged from the retain member 152. Moreover, the connector 13 can be driven by the drive device 14 to restore to its original state. As a result, the lock members 12 can be driven by the connector 13 to move to the unlock position from the lock position.

Figure 14:
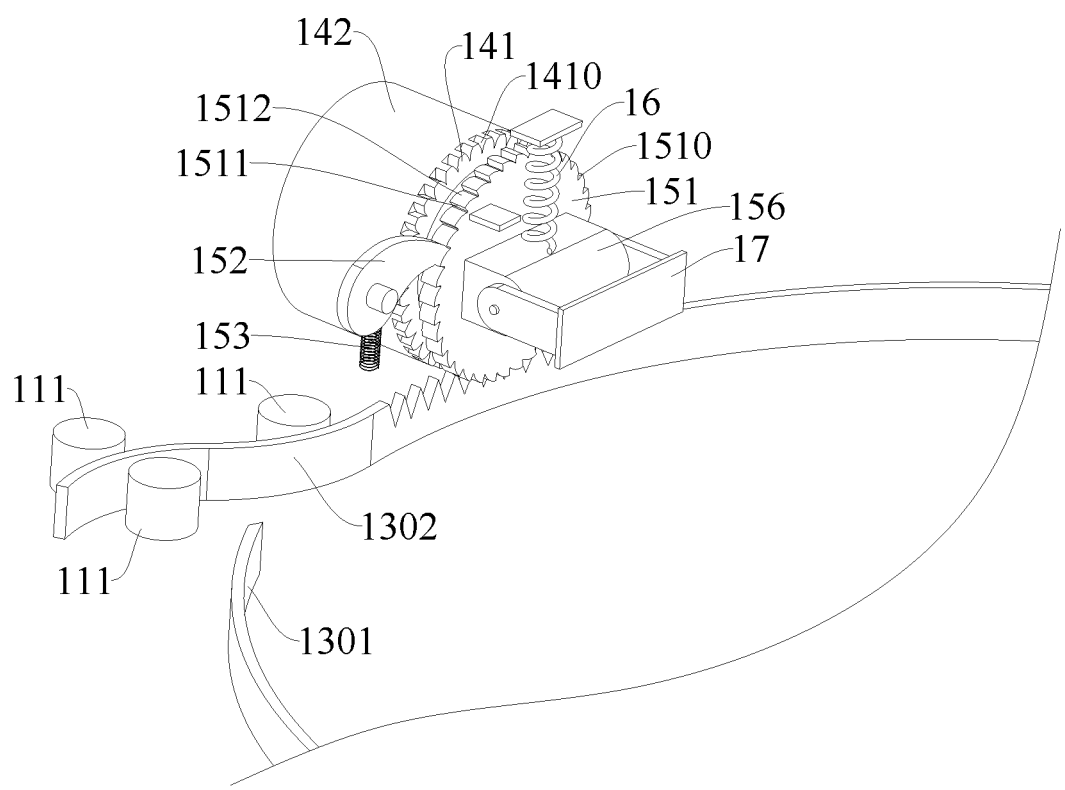
FIG. 14 is a schematic structural view of a connector and a drive device of a pressure cooker according to another embodiment of the present disclosure.

As illustrated in FIG. 14, in the embodiment, the second rotation member 151 is swingable between the first position and the second position. The second rotation member 151 is provided with the limit member 18 at side of the second rotation member 151. When the second rotation member 151 is at the first position, the limit member 18 and the lid body 11 are spaced apart from each other. In this case, the second rotation member 151 is engaged with the retain member 152 to avoid the resilience of the connector 13. When the second rotation member 151 rotates to the second position, the limit member 18 abuts with the lid body 11 in such a manner that the second rotation member 151 would not continue to move. In this case, the second rotation member 151 is disengaged from the retain member 152. Moreover, the connector 13 can be driven by the drive device 14 to restore to its original state. As a result, the lock members 12 can be driven by the connector 13 to move to the unlock position from the lock position.

As illustrated in FIG. 14 to FIG. 17, in some examples, the lid body 11 is provided with a reset member 16. The reset member 16 is connected to one of the second rotation member 151 and the retain member 152. The reset member 16 can drive one of the second rotation member 151 and the retain member 152 to move towards the first position, to allow the retain device 15 to restore to its initial state. Therefore, the retain device 15 can operate normally to avoid the resilience of the connector 13.

In some examples, one of the second rotation member 151 and the retain member 152 is movable between the first position and the second position in a predetermined direction. When the retaining effect of the retain device 15 needs to be removed, one of the second rotation member 151 and the retain member 152 may be pressed or pushed one time or several times to move, to disengage the second rotation member 151 from the retain member 152.

After the pot lid assembly 100 covers the pot body assembly 200, the connector 13 may be tensioned by the drive device 14 to move one of the second rotation member 151 and the retain member 152 to the first position. Since the second rotation member 151 and the retain member 152 are engaged with each other, the retain device 15 can provide the retaining effect. In this way, the resilience of the connector 13 can be avoided. Therefore, the lock members 12 can be retained at any position between the unlock position and the lock position until the lock members 12 moves to the lock position. Therefore, the pot lid assembly 100 is locked at the pot body assembly 200.

When the lid needs to be opened, one of the second rotation member 151 and the retain member 152 may be driven to move to the second position. In this way, the second rotation member 151 is disengaged from the retain member 152. The retaining of the retain device 15 is removed. The drive device 14 can allow for the resilience of the connector 13 to allow the lock members 12 to return to the unlock position, thereby realizing the separation of the lock members 12 from the pot body assembly 200. Therefore, a convenient lid opening operation is achieved. After the lid is opened, one of the second rotation member 151 and the retain member 152 is reset under the action of the reset member 16, i.e., moves to the first position.

It should be noted that, in an embodiment where the second rotation member 151 is coaxial with the first rotation member 141 and the second rotation member 151 is movable between the first position and the second position, when the second rotation member 151 is at the first position, the second rotation member 151 is engaged with the retain member 152, and the first rotation member 141 is engaged with the connector 13. In this case, the first rotation member 141 may rotate in one direction to drive the connector 13 to be tensioned. In this way, the connector 13 can drive the lock members 12 to move towards the lock position from the unlock position. Therefore, the pot lid assembly 100 can be locked at the pot body assembly 200. In this process, the resilience of the connector 13 would not occur.

When it is necessary to open the lid, the second rotation member 151 may be driven to move to the second position from the first position to disengage the second rotation member 151 from the retain member 152. Meanwhile, the first rotation member 141 is disengaged from the connector 13. The connector 13 may be loosened under the action of the elastic potential energy stored in the connector 13. Moreover, the connector 13 can drive the lock members 12 to move towards the unlock position from the lock position. Therefore, the lid opening can be realized. Finally, an acting force on the second rotation member 151 is removed. The second rotation member 151 may return to the first position under the action of the reset member 16. Meanwhile, the first rotation member 141 is reset.

Figure 17:
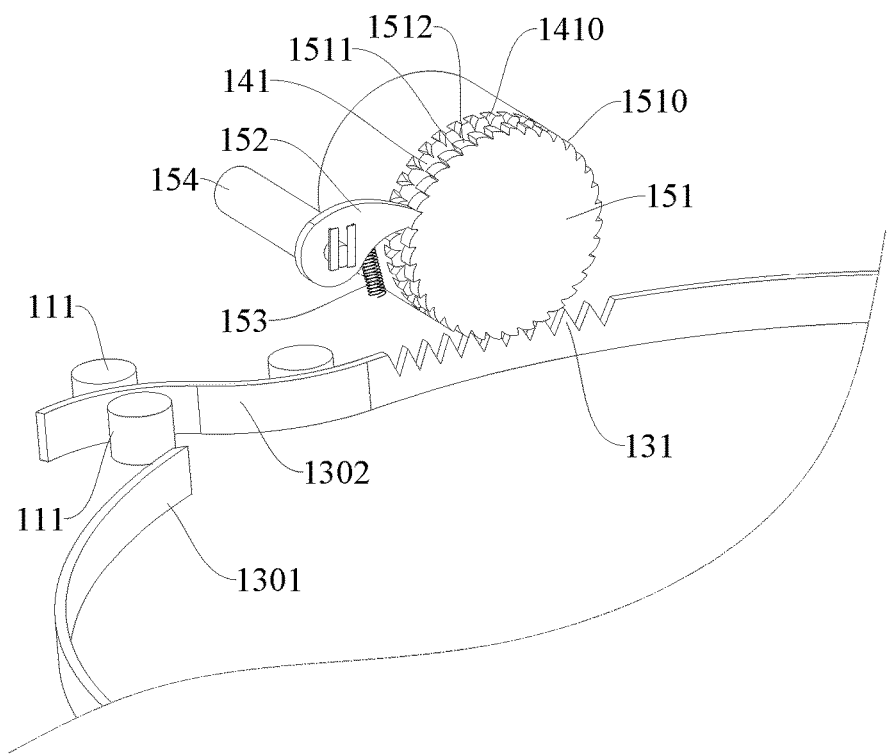
FIG. 17 is a schematic structural view of a connector and a drive device of a pressure cooker according to an embodiment of the present disclosure.

As illustrated in FIG. 17, in some exemplary examples, the lid body 11 has a slide member 19. One of the second rotation member 151 and the retain member 152 has a slide mating member engaged with the slide member 19.

Therefore, through mutual engagement between the slide member 19 and the slide mating member, a guiding effect can be achieved. Moreover, it is ensured that one of the second rotation member 151 and the retain member 152 can move in the predetermined direction.

In some exemplary examples, the predetermined direction is parallel to a rotation axis of one of the second rotation member 151 and the retain member 152. Therefore, an arrangement of a structure for driving the movement of one of the second rotation member 151 and the retain member 152 is facilitated.

Figure 15:
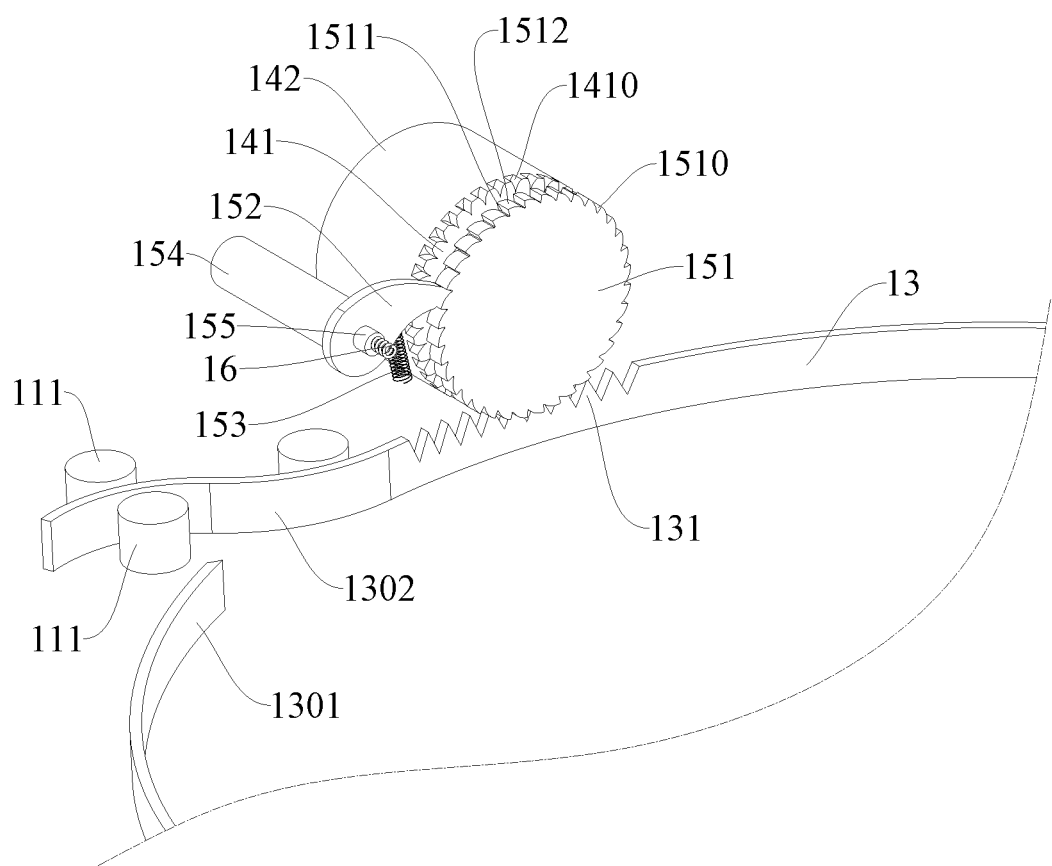
FIG. 15 is a schematic structural view of a connector and a drive device of a pressure cooker according to further another embodiment of the present disclosure.

As illustrated in FIG. 15, in the embodiment, the retain member 152 is movable along a rotation axis of the retain member 152. The retain member 152 is provided with a mounting protrusion 155 at a side of the retain member 152. The mounting protrusion 155 extends along the rotation axis of the retain member 152. The reset member 16 is connected between the mounting protrusion 155 and the lid body 11.

When the retain member 152 moves to the second position from the first position, the retain member 152 is disengaged from the second rotation member 151. In this way, a force exerted on the second rotation member 151 by the retain member 152 is removed to allow for the resilience of the connector 13. As a result, the lock members 12 can return to the unlock position.

When the retain member 152 moves to the first position from the second position, the retain member 152 is engaged with the second rotation member 151. In this case, the retain member 152 can provide a retaining effect to allow the second rotation member 151 to rotate in one direction as much as possible. Therefore, the resilience of the connector 13 can be avoided. In addition, the lock members 12 can be retained at any position between the unlock position and the lock position.

In an exemplary embodiment of the present disclosure, the retain member 152 is further provided with an operation member 154 at a side portion of the retain member 152. When the retain member 152 is at the first position, the retain member 152 is engaged with the second rotation member 151. The connector 13 may be driven by the drive device 14 to be tensioned. In this way, the lock members 12 are driven by the connector 13 to move towards the lock position. When the user presses the operation member 154 to disengage the retain member 152 from the second rotation member 151. The connector 13 may be driven by the drive device 14 to be loosened. In this way, he connector 13 can drive the lock members 12 to move towards the unlock position. During this process, the elastic potential energy is stored in the reset member 16. Due to the presence of the reset member 16, the operation member 154 can be automatically reset.

In some other exemplary examples, the predetermined direction is tilted relative to the rotation axis of one of the second rotation member 151 and the retain member 152. In this way, interference between the second rotation member 151 and the retain member 152 during movement can be avoided.

As illustrated in FIG. 17, in the present embodiment, the retain member 152 is provided with a slide member at a side portion of the retain member 152. The slide member extends in the predetermined direction. The predetermined direction is tilted relative to the rotation axis of the retain member 152. Correspondingly, the lid body 11 is provided with a slide mating member. The slide member is slidably engaged with the slide mating member. For example, the slide member includes two slide rails spaced apart from each other. A length direction of each slide rail extends in the predetermined direction. Each slide rail has an L-shaped cross section. The slide mating member is at least partially arranged between the two slide rails.

In some embodiments, one of the second rotation member 151 and the retain member 152 is swingable between the first position and the second position, to facilitate driving and resetting. When the retaining effect of the retain device 15 needs to be removed, one of the second rotation member 151 and the retain member 152 may be toggled one or more times to disengage the second rotation member 151 from the retain member 152.

In an exemplary embodiment of the present disclosure, after the pot lid assembly 100 covers the pot body assembly 200, the connector 13 can be tensioned by the drive device 14. Moreover, one of the second rotation member 151 and the retain member 152 is rotated to the first position. Since the second rotation member 151 and the retain member 152 are engaged with each other, the retain device 15 can provide the retaining effect to avoid the resilience of the connector 13. In this way, the lock members 12 can be retained at any position between the unlock position and the lock position until the lock members 12 move to the lock position. As a result, the pot lid assembly 100 is locked at the pot body assembly 200.

When the lid needs to be opened, one of the second rotation member 151 and the retain member 152 may be driven to rotate to the second position to disengage the second rotation member 151 from the retain member 152 The retaining of the retain device 15 is removed. The resilience of the connector 13 may be caused by the drive device 14. In this way, the lock members 12 can return to the unlock position, to realize the separation of the lock members 12 from the pot body assembly 200. Therefore, the convenient lid opening operation can be realized. After the lid is opened, one of the second rotation member 151 and the retain member 152 is reset under the action of the reset member 16, i.e., moves to the first position.

In some exemplary embodiments, the lid body 11 is provided with a mounting base 17. One of the second rotation member 151 and the retain member 152 is disposed at the mounting base 17 in a swingable manner. By providing the mounting base 17 at the lid body 11, the mounting of the second rotation member 151 or the mounting of the retain member 152 is facilitated.

As illustrated in FIG. 14, in the embodiment, the mounting base 17 may be formed as a U-shaped mounting frame. The second rotation member 151 is provided with a connection protrusion 156. The connection protrusion 156 is located between two support plates of the mounting frame, Moreover, two ends of the connection protrusion 156 and the two support plates are rotatably connected through a rotary shaft. Further, a reset member 16 is provided between a side of the connection protrusion 156 and the lid body 11. The reset member 16 is configured to drive the second rotation member 151 to return to the first position from the second position.

Figure 16:
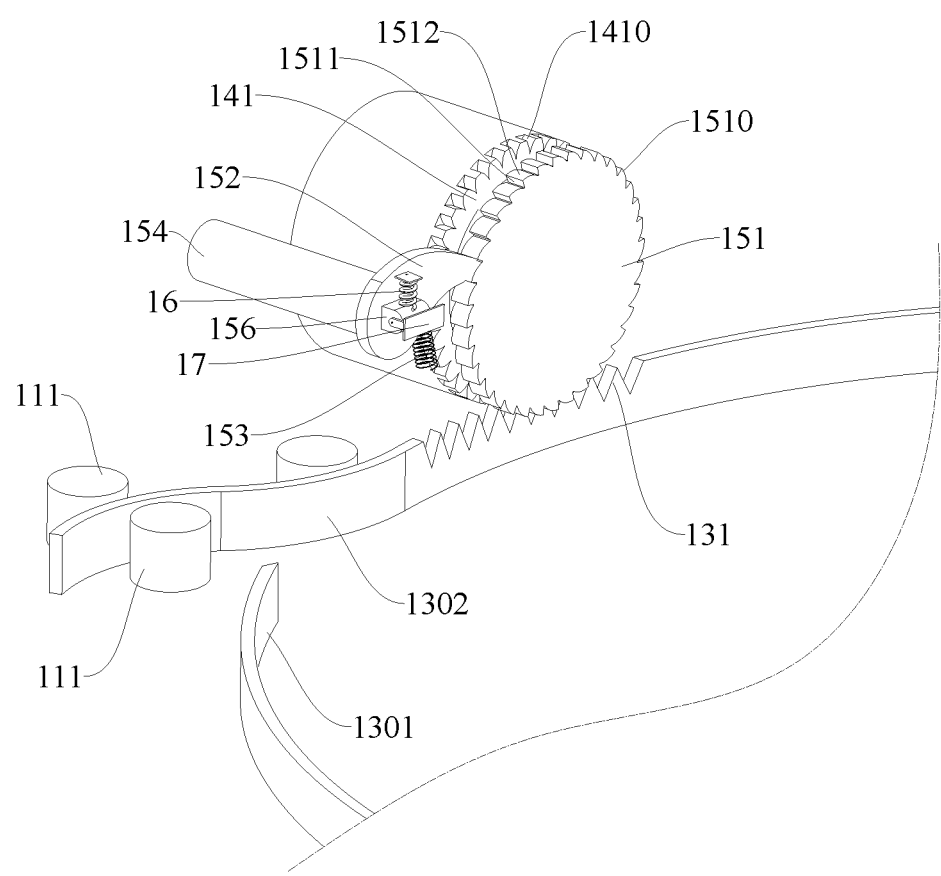
FIG. 16 is a schematic structural view of a connector and a drive device of a pressure cooker according to yet another embodiment of the present disclosure.

As illustrated in FIG. 16, in the embodiment, the mounting base 17 may be formed as a U-shaped mounting frame. The retain member 152 is provided with a connection protrusion 156. The connection protrusion 156 is located between two support plates of the mounting frame. Moreover, two ends of the connection protrusion 156 and the two support plates are rotatably connected through a rotary shaft. Further, a reset member 16 is provided between a side of the connection protrusion 156 and the lid body 11. The reset member 16 is configured to drive the retain member 152 to return to the first position from the second position.

According to some embodiments of the present disclosure, the pot lid assembly 100 further includes a detection device and a heating device. The detection device is configured to detect a lock state of the pot lid assembly 100 and the pot body assembly 200. When the detection device detects that the pot lid assembly 100 is locked at the pot body assembly 200, the heating device may be controlled to operate. When the detection device detects that the pot lid assembly 100 is unlocked at the pot body assembly 200, the heating device may be controlled not to operate.

As illustrated in FIG. 13 to FIG. 21, according to a further embodiment of the present disclosure, the connector 13 has a first end 1301 and a second end 1302 in the extending direction of the connector 13. The first end 1301 of the connector 13 is connected to the lid body 11, and the second end 1302 of the connector 13 is connected to the drive device 14. That is, two ends of the connector 13 are connected to the lid body 11 and the drive device 14, respectively. In this way, mounting reliability of the connector 13 can be ensured.

In an exemplary embodiment of the present disclosure, when the drive device 14 operates, the second end 1302 of the connector 13 may be driven by the drive device 14 to move. Since the first end 1301 of the connector 13 is connected to the lid body 11, the connector 13 can be tensioned. In this way, the connector 13 is deformed. As a result, the connector can drive the lock members 12 to move to the lock position from the unlock position, to lock the pot lid assembly 100 at the pot body assembly 200. When the pot lid assembly 100 needs to be removed, a force exerted on the connector 13 may be removed. In this way, the connector 13 may restored to its original state. In this way, the lock members 12 are driven to move to the unlock position from the lock position. Therefore, the separation of the lock members 12 from the pot body assembly 200 can be achieved.

In some embodiments, the lid body 11 is provided with at least one guide member 111. The guide member 111 is configured to guide a sliding direction of the connector 13 to ensure that the connector 13 can move along a predetermined trajectory.

The guide member 111 includes a plurality of guide posts. At least two guide posts are located at two sides of the connector 13 to prevent the connector 13 from not moving along the predetermined trajectory. The at least two guide posts are arranged at intervals in the extending direction of the connector 13. Each guide post can achieve the guiding effect.

As illustrated in FIG. 18 to FIG. 21, in some embodiments, the lid body 11 is provided with a guide member 112. The guide member 112 includes a guide rod 1121. The first end 1301 of the connector 13 is slidably engaged with the guide rod 1121.

In an exemplary embodiment of the present disclosure, the first end 1301 of the connector 13 has a connection hole. The guide rod 1121 passes through the connection hole. Each of two ends of the guide rod 1121 is provided with an anti-disengagement lug 1123. The anti-disengagement lug 1123 has a size greater than a size of the connection hole. The anti-disengagement lug 1123 can restrict a travel of the first end 1301 of the connector 13. In this way, the first end 1301 of the connector 13 can only move between two anti-disengagement lugs 1123.

Therefore, by providing the guide rod 1121 and slidably engaging the guide rod 1121 with the first end 1301 of the connector 13, when the lock members 12 are controlled to move between the lock position and the unlock position, the first end 1301 of the connector 13 can move in an axial direction of the guide rod 1121. As a result, it is ensured that the plurality of lock members 12 can move synchronously. In this way, a lid opening and closing process is smoother.

Figure 18:
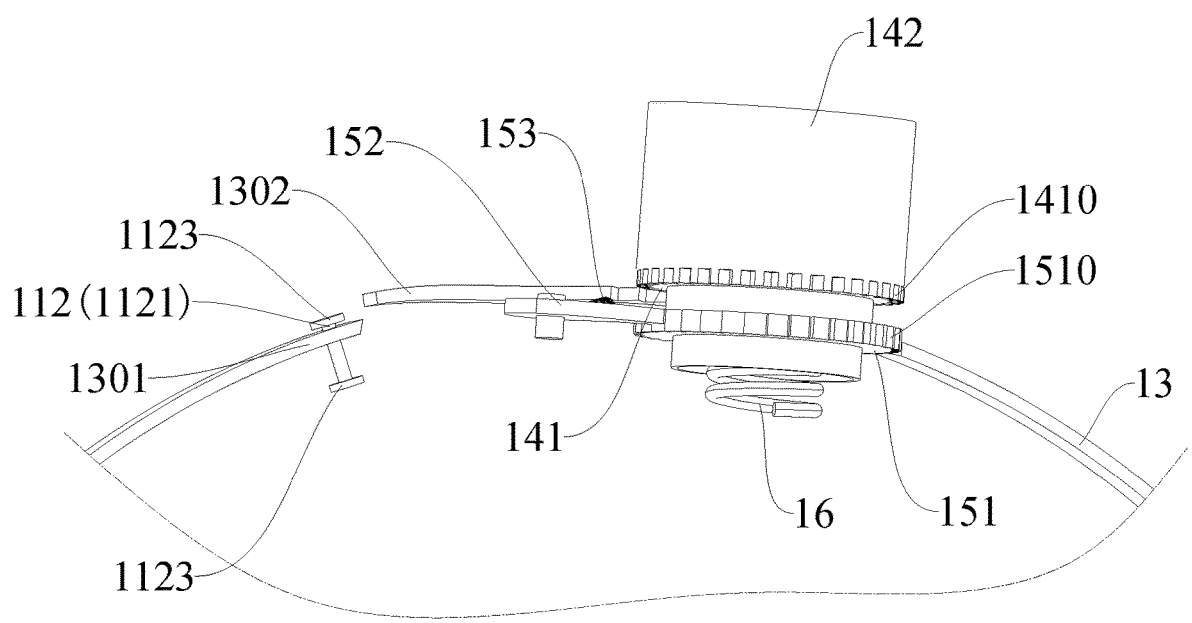
FIG. 18 is a schematic structural view of a connector and a drive device of a pressure cooker according to another embodiment of the present disclosure.
Figure 19:
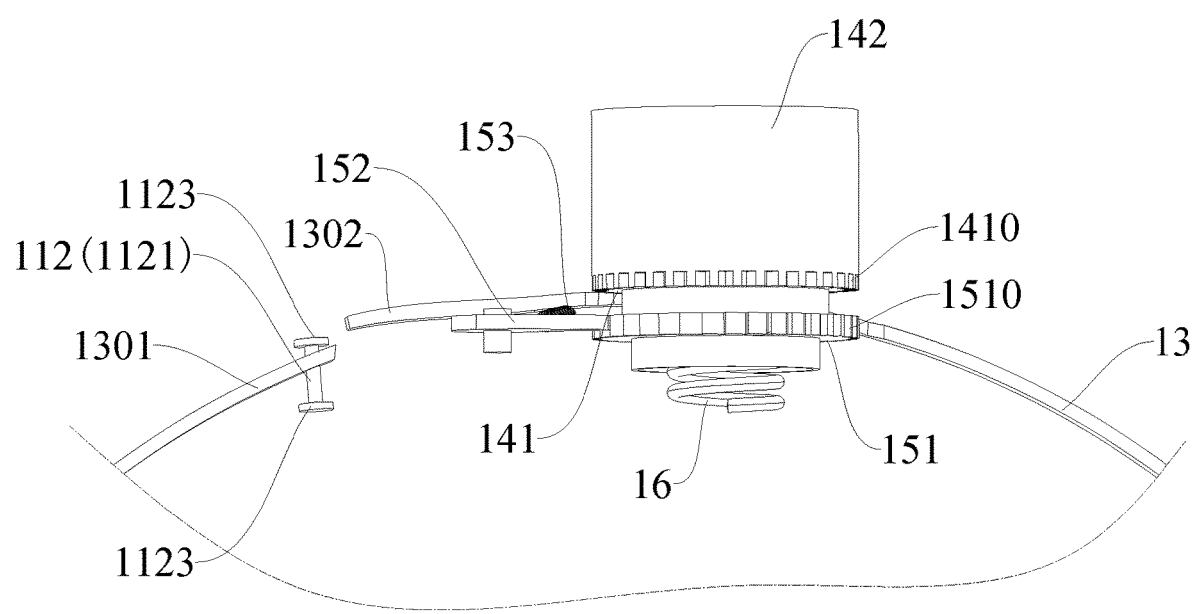
FIG. 19 is a schematic structural view of a connector and a drive device of a pressure cooker according to further another embodiment of the present disclosure.
Figure 20:
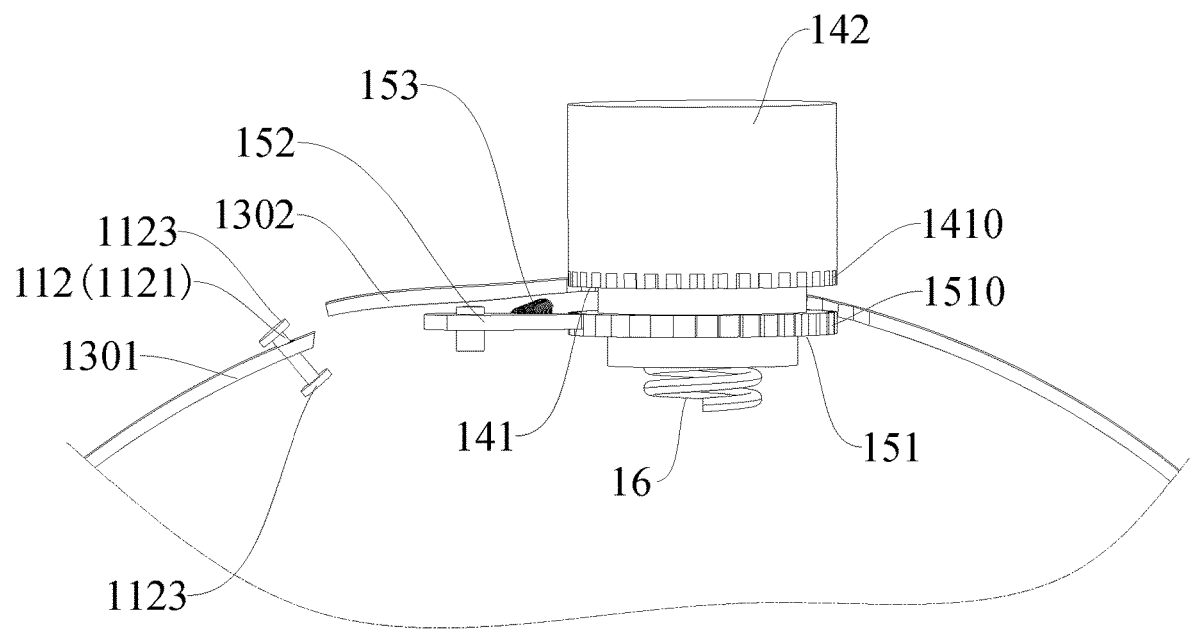
FIG. 20 is a schematic structural view of a connector and a drive device of a pressure cooker according to yet another embodiment of the present disclosure.

As illustrated in FIG. 18 to FIG. 20, in some exemplary embodiments, the guide rod 1121 extends in a radial direction of the lid body 11 or obliquely extends relative to the radial direction of the lid body 11. In this way, the first end 1301 of the connector 13 can move in the radial direction of the lid body 11 or in a direction inclined relative to the radial direction of the lid body 11. Therefore, the plurality of lock members 12 can move synchronously. Further, it is ensured that the lid opening or lid closing is smoother.

Figure 21:
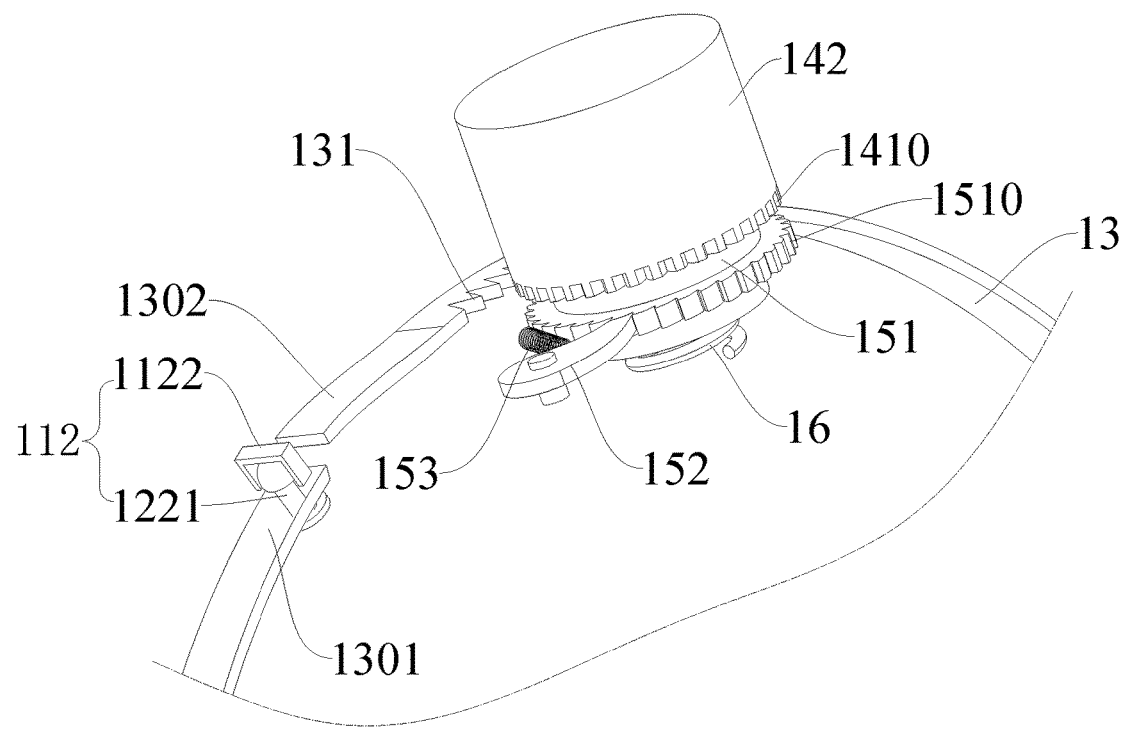
FIG. 21 is a schematic structural view of a connector and a drive device of a pressure cooker according to an embodiment of the present disclosure.
Figure 22:
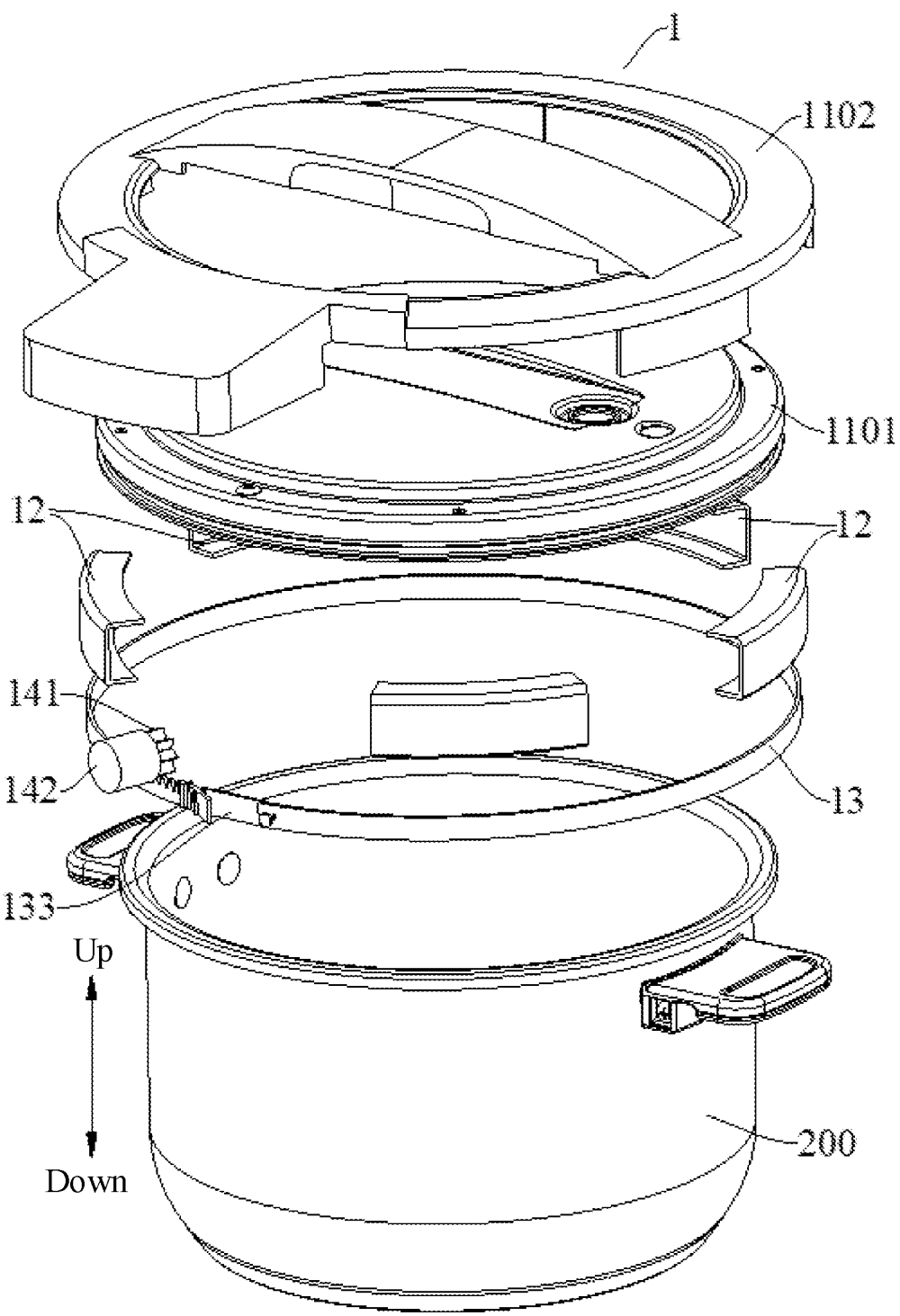
FIG. 22 is a exploded structural view of a pressure cooker according to another embodiment of the present disclosure.
Figure 23:
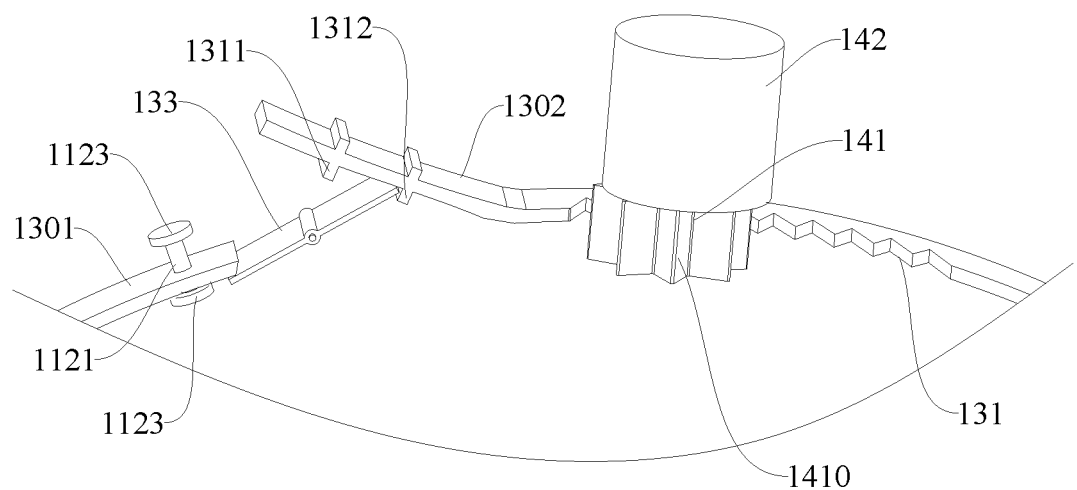
FIG. 23 is a schematic structural view of a connector and a drive device of a pressure cooker shown in FIG. 22.

As illustrated in FIG. 21, in some exemplary embodiments, the guide member 112 further includes a fixation base 1122. An end of the guide rod 1121 is movably connected to the fixation base 1122, to allow the guide rod 1121 to automatically adjust its direction. Therefore, the plurality of lock members 12 can move synchronously.

For example, an end of the guide rod 1121 is connected to the fixation base 1122 in a swingable or shakable manner. In an exemplary embodiment of the present disclosure, the end of the guide rod 1121 is connected to the fixation base 1122 by a rotation pair, a spherical hinge, a universal hinge, or the like.

The guide member 112 may be disposed at an edge position close to the lid body 11, and may also be disposed at a middle position close to the lid body 11.

As illustrated in FIG. 22 to FIG. 25, in some specific embodiments, the lid body 11 is provided with a toggle member 133. The toggle member 133 is movable at the lid body 11. The toggle member 133 is connected to the two ends of the connector 13. In a state where the connector 13 is driven by the drive device to be deformed, in an exemplary embodiment of the present disclosure, in a state where the first rotation member 141 is driven by the drive member 142 to rotate, the toggle member 133 moves to toggle the first end 1301 of the connector 13 to slide along the guide rod 1121.

When performing the lid closing operation, the first rotation member 141 may be driven by the drive member 142 to rotate forwardly to pull the connector 13 to be tensioned. In this way, the lock members 12 can be driven by the connector 13 to move towards the lock position from the unlock position, to lock the lock members 12 and the pot body assembly 200 together. Therefore, the pot lid assembly can be locked at the pot body assembly 200.

In this process, the toggle member 133 may be driven by the second end 1302 of the connector 13 to move. The first end 1301 of the connector 13 may be driven by the toggle member 133 to slide towards a center of the lid body 11 along the guide rod 1121. In this way, the lock members 12 close to the first end 1301 of the connector 13 can be well attached to the lid body 11 and the pot body assembly 200. Therefore, a lock effect can be ensured.

When performing the lid opening operation, the first rotation member 141 may be driven by the drive member 142 to rotate reversely to pull the connector 13 to be loosened. That is, the connector 13 restores to its original state. Finally, the lock members 12 are driven by the connector 13 to move towards the unlock position from the lock position, to separate the lock member 12 from the pot body assembly 200. Therefore, the pot lid assembly can be removed from the pot body assembly 200.

In this process, the toggle member 133 may be driven by the first end 1301 of the connector 13 to move. The first end 1301 of the connector 13 may be driven by the toggle member 133 to slide away from the center of the lid body 11 along the guide rod 1121. In this way, the lock members 12 close to the first end 1301 of the connector 13 can move away from the lid body 11 and the pot body assembly 200 well, to synergistically move with other lock members 12. Therefore, the opening of the lid can be achieved.

Therefore, by providing the toggle member 133, the toggle member 133 can move during the restoring of the connector 13. In this way, the first end 1301 of the connector 13 is driven by the toggle member 133 to slide along the guide rod 1121. As a result, the lock members 12 close to the first end 1301 of the connector 13 can move synchronously with other lock members 12. Therefore, the smoothness of lock or unlock of the lock members 12 can be ensured.

In some examples, the toggle member 133 is formed as a toggle rod. The toggle rod has two ends fixedly or movably connected to the first end 1301 and the second end 1302 of the connector 13, respectively.

In an exemplary embodiment of the present disclosure, it is possible for one end of the toggle rod to be fixedly connected to the first end 1301 of the connector 13, and the other end of the toggle rod to be fixedly connected to the second end 1302 of the connector 13. It is also possible for one end of the toggle rod to be fixedly connected to the first end 1301 of the connector 13 and the other end of the toggle rod to be movably connected to the second end 1302 of the connector 13. It is also possible for one end of the toggle rod to be movably connected to the first end 1301 of the connector 13, and the other end of the toggle rod to be fixedly connected to the second end 1302 of the connector 13. It is also possible for one end of the toggle rod to be movably connected to the first end 1301 of the connector 13, and the other end of the toggle rod to be movably connected to the second end 1302 of the connector 13.

Therefore, by constructing the toggle member 133 as a toggle rod, the connection between the toggle member 133 and the first end 1301 and the connection between the toggle member 133 and the second end 1302 of the connector 13 is made more convenient. Moreover, the toggle rod occupies a small space. Therefore, the toggle rod can be prevented from interfering with other components.

In some exemplary examples, a middle part of the toggle rod is rotatably connected to the lid body 11.

It should be noted that the middle part of the toggle rod herein may be directly located at the center of the toggle rod in the length direction thereof, or may be a part of the toggle rod offset from two ends of the toggle rod. A ratio of a distance a rotation center of the toggle rod to a distance of the center of the toggle rod from one end of the toggle rod to a distance of the center of the toggle rod from the other end of the toggle rod may be selected as desired. The toggle rod may be formed as a lever structure or may be rotatably connected to the lid body 11 by the rotary shaft.

The second end 1302 of the connector 13 is provided with a first stop member 1311 and a second stop member 1312. The first stop member 1311 and the second stop member 1312 are arranged in an extending direction of the connector 13. The second end of the toggle rod is located between the first stop member 1311 and the second stop member 1312. The toggle rod is configured to rotate when being driven by the first stop member 1311 and the second stop member 1312, toggling the first end 1301 of the connector 13 to slide along the guide rod 1121.

Figure 24:
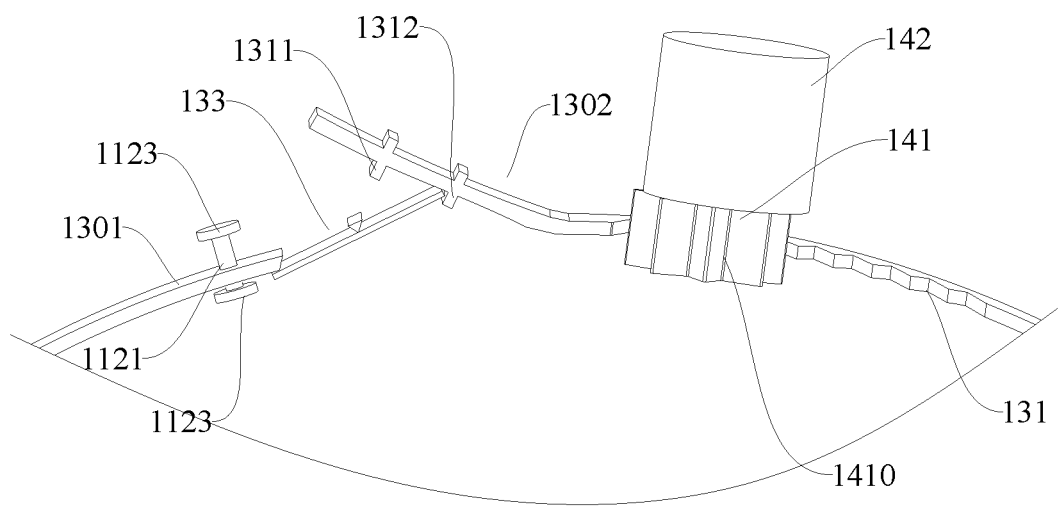
FIG. 24 is a schematic structural view of a connector and a drive device of a pressure cooker according to another embodiment of the present disclosure in which a second stop member abuts with a toggle member.

As illustrated in FIG. 24, when performing the lid closing operation, the first rotation member 141 may be driven by the drive member 142 to rotate forwardly to pull the connector 13 to be tensioned. In this way, the lock members 12 can be driven by the connector 13 to move towards the lock position from the unlock position. During this process, the toggle member 133 may be driven by the second stop member 1312 to rotate anticlockwise. The first end 1301 of the connector 13 may be driven by the toggle member 133 to slide towards the center of the lid body 11 along the guide rod 1121. In this way, the lock members 12 close to the first end 1301 of the connector 13 can be well attached to the lid body 11 and the pot body assembly 200. In this way, the plurality of lock members 12 can be synchronously locked to the pot body assembly 200. Therefore, the pot lid assembly 100 can be locked at the pot body assembly 200.

Figure 25:
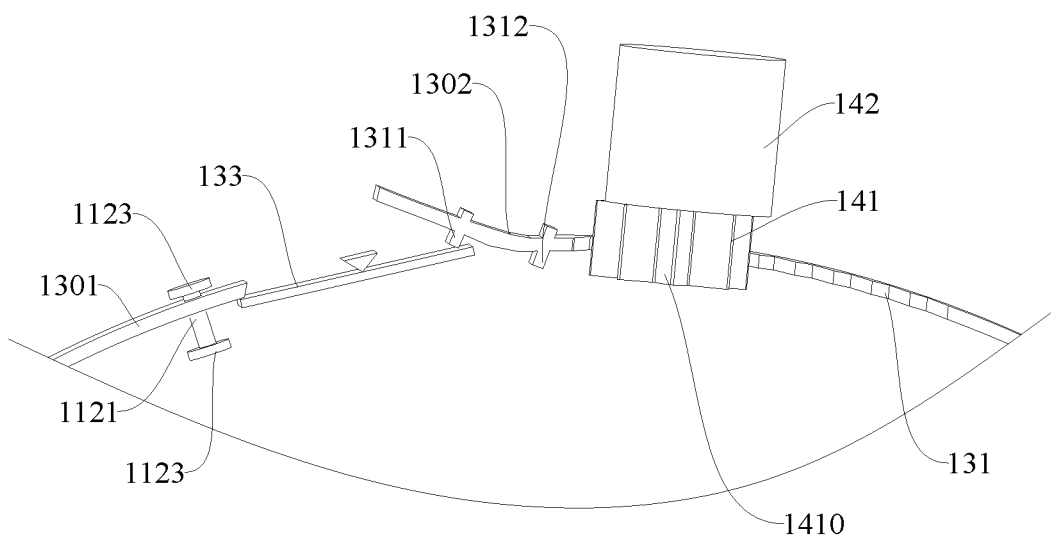
FIG. 25 is a schematic structural view of a connector and a drive device of a pressure cooker according to further another embodiment of the present disclosure in which a first stop member abuts with a toggle member.

As illustrated in FIG. 25, when performing the lid opening operation, the first rotation member 141 may be driven by the drive member 142 to rotate reversely to pull the connector 13 to be loosened. That is, the connector 13 restores to its original state. Finally, the lock members 12 can be driven by the connector 13 to move towards the lock position from the unlock position. In this process, the toggle member 133 may be driven by the first stop member 1311 to rotate clockwise. The first end 1301 of the connector 13 may be driven by the toggle member 133 to slide away from the center of the lid body 11 along the guide rod 1121. In this way, the lock members 12 close to the first end 1301 of the connector 13 can move away from the lid body 11 and the pot body assembly 200, and move synergistically with the other lock members 12 to allow synchronous separation of the plurality of lock members 12 from the pot body assembly 200. In this way, the pot lid assembly 100 can be removed from the pot body assembly 200.

A pressure cooker 1 according to an embodiment of the present disclosure will be described below with reference to the accompanying drawings.

The pressure cooker 1 according to an embodiment of the present disclosure includes a pot body assembly 200 and the pot lid assembly 100 for the pressure cooker according to the above embodiments. When being at the lock position, the plurality of lock members 12 and the pot body assembly 200 are locked together. In addition, when being at the unlock position, the plurality of lock members 12 and the pot body assembly 200 are unlocked.

Since the pot lid assembly 100 for the pressure cooker according to the embodiments of the present disclosure has the above technical effects, the pressure cooker 1 according to the embodiments of the present disclosure also has the above technical effects. That is, by using the pot lid assembly 100 as described above, simplification of the structure of the pressure cooker 1 is beneficial, thereby providing more convenient assembling and disassembling steps. Therefore, the production difficulty and the production cost are reduced. In addition, the production efficiency is improved.

In the description of the present disclosure, it is to be understood that, terms such as "central," "length," "width," "thickness," "upper," "lower," "front," "rear," "back," "left," "right," "vertical," "horizontal," "top," "bottom," "inner," "outer," "clockwise," "counterclockwise," "axial," "radial," and "circumferential," should be constructed to refer to the orientation or position as described or as shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

Other arrangements and operations of the pot lid assembly 100 for the pressure cooker and the pressure cooker according to the embodiments of the present disclosure are known to those of ordinary skill in the art, and the description thereof in detail will be omitted herein.

In the description of this specification, descriptions with reference to the terms "an embodiment," "some embodiments," "schematic embodiments," "examples," "specific examples," or "some examples" etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described, it is conceivable for those of ordinary skilled in the art that various changes, modifications, replacements, and variations can be made to these embodiments without departing from the principles and spirit of the present disclosure. The scope of the present disclosure shall be defined by the claims as appended and their equivalents.

What is claimed is:
1. A pot lid assembly comprising:
   a lid body;
   a plurality of lock members arranged in a circumferential direction of the lid body, each of the plurality of lock members being movable between a lock position at which the lock member is close to a middle of the lid body and an unlock position at which the lock member is far away from the middle of the lid body;
a connector extending in the circumferential direction of the lid body and connected to the plurality of lock members; and
a drive device connected to the connector, the drive device being configured to drive the connector deform to drive the plurality of lock members to move between the lock position and the unlock position;
wherein in an extending direction of the connector, the connector has a first end connected to the lid body and a second end connected to the drive device.

2. The pot lid assembly according to claim 1, wherein the connector includes a metal member.

3. The pot lid assembly according to claim 1, wherein the connector is of a strip-shaped structure having a width ranging from 2 mm to 20 mm and a thickness ranging from 0.1 mm to 3 mm.

4. The pot lid assembly according to claim 1, wherein the drive device includes:
a rotation member connected to the connector to pull the connector to deform; and
a drive member connected to the rotation member to drive the rotation member to rotate.

5. The pot lid assembly according to claim 4, wherein the second end of the connector is connected to the rotation member to be wound around the rotation member during rotation of the rotation member.

6. The pot lid assembly according to claim 4, wherein:
the rotation member is provided with a plurality of meshing teeth arranged in a circumferential direction of the rotation member;
the connector is provided with a plurality of mating teeth arranged in an extending direction of the connector; and
the rotation member is in a transmission connection with the connector by the plurality of first meshing teeth and the plurality of first mating teeth.

7. The pot lid assembly according to claim 4, further comprising:
a retain device in a transmission connection with the connector to block the plurality of lock members from moving towards the unlock position from the lock position by the connector.

8. The pot lid assembly according to claim 7, wherein:
the rotation member is a first rotation member; and
the retain device includes:
a second rotation member in a transmission connection with the connector to move synchronously with the connector; and
a retain member in a one-way transmission connection with the second rotation member, the retain member being configured to only permit unidirectional rotation of the second rotation member to block the plurality of lock members from moving towards the unlock position from the lock position by the connector.

9. The pot lid assembly according to claim 8, wherein:
the second rotation member includes a plurality of second meshing teeth, each of the plurality of second meshing teeth having a stop surface and a guide surface opposite to the stop surface;
the retain member is configured to, in a state where the second rotation member rotates in a first direction, slide relative to the guide surface and be engaged with the stop surface, to block the second rotation member from rotating in a second direction opposite to the first direction.

10. The pot lid assembly according to claim 8, wherein the second rotation member is fixedly connected to the first rotation member to allow for a coaxial rotation of the second rotation member with the first rotation member.

11. The pot lid assembly according to claim 8, wherein one of the second rotation member and the retain member is movable between a first position at which the second rotation member is engaged with the retain member and a second position at which the second rotation member is disengaged from the retain member.

12. The pot lid assembly according to claim 11, wherein the one of the second rotation member and the retain member or the lid body is provided with a limit member configured to limit a travel of the one of the second rotation member and the retain member.

13. The pot lid assembly according to claim 11, wherein the lid body is provided with a reset member connected to the one of the second rotation member and the retain member to drive the one of the second rotation member and the retain member to move towards the first position.

14. The pot lid assembly according to claim 11, wherein the one of the second rotation member and the retain member is movable between the first position and the second position in a predetermined direction.

15. The pot lid assembly according to claim 14, wherein:
the lid body includes a slide member; and
the one of the second rotation member and the retain member includes a slide mating member engaged with the slide member.

16. The pot lid assembly according to claim 14, wherein:
the predetermined direction is parallel to a rotation axis of the one of the second rotation member and the retain member; or
the predetermined direction is tilted relative to a rotation axis of the one of the second rotation member and the retain member.

17. The pot lid assembly according to claim 11, wherein the one of the second rotation member and the retain member is swingable between the first position and the second position.

18. The pot lid assembly according to claim 17, wherein:
the lid body is provided with a mounting base; and
the one of the second rotation member and the retain member is disposed at the mounting base in a swingable manner.

19. The pot lid assembly according to claim 1, wherein the lid body is provided with at least one guide member for guiding a sliding direction of the connector.

20. A pot lid assembly comprising:
a lid body;
a plurality of lock members arranged in a circumferential direction of the lid body, each of the plurality of lock members being movable between a lock position at which the lock member is close to a middle of the lid body and an unlock position at which the lock member is far away from the middle of the lid body;
a connector extending in the circumferential direction of the lid body and connected to the plurality of lock members; and
a drive device connected to the connector, the drive device being configured to drive the connector deform to drive the plurality of lock members to move between the lock position and the unlock position, and the drive device including:

a rotation member connected to the connector to pull the connector to deform; and a drive member connected to the rotation member to drive the rotation member to rotate;

wherein:

the connector has an end connected to the rotation member to be wound around the rotation member during rotation of the rotation member; or the rotation member is provided with a plurality of meshing teeth arranged in a circumferential direction of the rotation member, the connector is provided with a plurality of mating teeth arranged in an extending direction of the connector, and the rotation member is in a transmission connection with the connector by the plurality of first meshing teeth and the plurality of first mating teeth; or the pot lid assembly further includes a retain device in a transmission connection with the connector to block the plurality of lock members from moving towards the unlock position from the lock position by the connector.

* * * * *